United States Patent
Moffat et al.

(10) Patent No.: US 12,372,052 B1
(45) Date of Patent: *Jul. 29, 2025

(54) WAVE ENERGY CONVERTER WITH SURFACE ELECTRIC GRID

(71) Applicant: LONE GULL HOLDINGS, LTD., Portland, OR (US)

(72) Inventors: Brian Lee Moffat, Portland, OR (US); Garth Alexander Sheldon-Coulson, Portland, OR (US)

(73) Assignee: LONE GULL HOLDINGS, LTD., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,299

(22) Filed: Jan. 18, 2024

Related U.S. Application Data

(63) Continuation of application No. 17/548,462, filed on Dec. 10, 2021, now Pat. No. 11,879,421, which is a continuation of application No. 16/495,044, filed as application No. PCT/US2018/023099 on Mar. 19, 2018, now Pat. No. 11,248,580.

(60) Provisional application No. 62/473,361, filed on Mar. 18, 2017.

(51) Int. Cl.
    F03B 13/18    (2006.01)
(52) U.S. Cl.
    CPC .................... *F03B 13/18* (2013.01)

(58) Field of Classification Search
    CPC ........................................ F03B 13/18
    USPC ...................................... 290/42, 53
    See application file for complete search history.

(56) References Cited

U.S. PATENT DOCUMENTS

| | | | | |
|---|---|---|---|---|
| 7,245,041 B1* | 7/2007 | Olson | ............... | F03B 13/1885 60/497 |
| 7,925,387 B2* | 4/2011 | Zheng | ............... | F03D 9/28 60/39.12 |
| 8,803,346 B2* | 8/2014 | Pitre | ............... | F03D 9/25 290/42 |
| 11,879,421 B2* | 1/2024 | Moffat | ............... | F03B 13/18 |
| 2007/0224895 A1* | 9/2007 | Draper | ............... | B63B 21/50 441/3 |
| 2009/0288612 A1* | 11/2009 | Himmelstrup | ............... | B63B 21/50 114/230.1 |
| 2011/0057448 A1* | 3/2011 | Page | ............... | F03B 13/20 290/53 |
| 2015/0349687 A1* | 12/2015 | Liang | ............... | H02P 9/007 322/61 |

* cited by examiner

*Primary Examiner* — Charles Reid, Jr.
(74) *Attorney, Agent, or Firm* — FULWIDER PATTON LLP

(57) ABSTRACT

An energy farm comprising an electrical grid through which power generated by the devices in the farm may be combined and transmitted. The electrical grid is formed through the electrical interconnection of devices in a farm through electrical connections that remain, in whole or at least in part, adjacent to the surface of the body of water on which the devices float. A plurality of converters of the network have no direct or immediate electrical interface with a subsea power cable (i.e. a cable on or under the seafloor), but instead transmit electricity to other converters in a daisy-chained fashion.

6 Claims, 34 Drawing Sheets

WAVE ENERGY CONVERTER WITH SURFACE ELECTRIC GRID

CROSS-REFERENCES TO RELATED APPLICATIONS

This continuation is based on U.S. Ser. No. 17/548,462, filed Dec. 10, 2021; issue date of Jan. 23, 2024, U.S. Pat. No. 11,879,421; which is a continuation based on U.S. Ser. No. 16/495,044, filed on Sep. 17, 2019, issue date of Feb. 15, 2022, U.S. Pat. No. 11,248,580; which is based on PCT/US2017/045120, filed on Mar. 19, 2018, which claims priority from U.S. Application No. 62/473,361, filed Mar. 18, 2017, the contents of which are fully incorporated by reference herein in its entirety.

BACKGROUND

In the prior art, buoyant wave energy converters ("converters") are typically deployed and moored individually, even when deployed at locations adjacent to one another, e.g. as in a "farm" of such converters. And, in the prior art, typically each converter is tethered to an electrical cable that descends to the seafloor where it is spliced into a subsea cable, into which the electrical cables of other converters in the farm are also spliced. At the very least, this means that a length of electrical cable equal to the depth of the water on which each converter floats is used to electrically connect each converter to the shared subsea power cable.

SUMMARY OF THE INVENTION

Disclosed is a novel system and architecture including an interconnected farm of buoyant wave energy converters, and/or other buoyant structures or devices (e.g., floating wind turbines), that share a common electrical grid positioned adjacent to the surface of the body of water on which the buoyant wave energy converters float. Furthermore, in a preferred embodiment, some of the grid's conductors (i.e. conducting wires) are of a relatively heavy gauge and/or a relatively high electrical rating or capacity, while others are of relatively lesser gauges and/or relatively lesser electrical ratings or capacities, so as to optimize the grid with respect to the consumption of resources and cost.

This disclosure, as well as the discussion regarding same, is made in reference to farms of ocean wave energy converters. However, the scope of this disclosure applies with equal force and equal benefit to any set, collection, group, and/or farm, of any type and/or combination of buoyant structure, machine, device, vessel, floating wind turbine, and/or ocean energy device.

This disclosure, as well as the discussion regarding same, is made in reference to farms of wave energy converters on or at the surface of an ocean. However, the scope of this disclosure applies with equal force and equal benefit to wave energy converters and/or other devices on or at the surface of an inland sea, a lake, and/or any other body of water or fluid.

The disclosed novel farm and/or farm architecture involves the creation of an electrical grid, through which power generated by the devices in a farm may be combined and transmitted. However, unlike the prior art, the electrical grid of the current disclosure is formed through the electrical interconnection of devices in a farm through electrical connections that remain, in whole or at least in part, adjacent to the surface of the body of water on which the devices float. In an embodiment, a plurality of converters of the network have no direct or immediate electrical interface with a subsea power cable (i.e. a cable on or under the seafloor), but instead transmit electricity to other converters in a daisy-chained fashion.

Such a "surface grid" results in a significant saving of electrical cable, and the materials of which such cable is fabricated, through an elimination of a segment of cable connecting each individual farm device to an electrical cable at the seafloor. For example, in a farm of 100 devices, floating in water with an approximate or average depth of 400 feet, no less than 40,000 feet of electrical cable is required to connect each device to a subsea power cable located on the seafloor. The current disclosure saves most of this cable, instead requiring at most a single 400-foot-long cable to transmit the farm's power to a subsea power cable.

The current disclosure encourages the use of electrical cables of differing gauges within a farm's surface grid. Relatively heavy, i.e. thick, gauges can be used to establish a "backbone" for the grid through which flow relatively large amounts of electrical energy, e.g. currents. Relatively light, e.g. thin, gauges can be used to connect peripheral devices to the backbone. Intermediate gauges can be used to transmit relatively small amounts of electrical energy between relatively smaller groups of devices and the backbone. Throughout this disclosure, it is to be understood that "heavy gauge" and "light gauge" electrical cables can refer to electrical cables of relatively higher and lower electrical ratings respectively, irrespective of actual physical gauge.

The current disclosure includes the design, fabrication, deployment, and interconnection of wave energy converters (and/or other buoyant devices) which are equipped with, and/or incorporate, electrical connectors and/or connection points arrayed in a standardized manner, pattern, distribution, and/or orientation, on a surface of the converter. These standardized, commodity, "cookie-cutter" converters can then be used as building blocks from which distributed farms of such converters can be assembled, and through which an electrical grid can be established and/or created within such a farm, through the addition, connection, and/or attachment, of electrical cables, including those possessing terminal electrical connectors compatible with the electrical connectors on each converter and/or those possessing switches or other apparatus configured to enable a wave energy converter to serve as an electrical terminus.

Some or all of the interconnections and/or sockets and/or plugs and/or connection interfaces needed to electrically connect, and/or interconnect, the electrical cables within the farm are able to be preinstalled within, and/or prefabricated as a part of, the standardized wave energy converters. Supporting electronics, monitoring sensors, and/or other electronic and/or electrical components, modules, and/or systems required of, and/or supportive of, the creation, operation, monitoring, diagnosing, and/or repair, of an electrical grid within a farm of wave energy converters may likewise be pre-installed within, and/or prefabricated as a part of, the standardized wave energy converters.

The wave energy converters of the present disclosure may be electrically interconnected with, through, and/or by, modular and/or standardized electrical cables, preferably containing, incorporating, connected to, and/or terminated by, electrical connectors that are complementary to, and/or compatible with, at least one or some of the electrical connectors on at least some of the converters.

The current disclosure discloses an electrical grid, and its formation through the connection of pre-fabricated elements (e.g. converters with standardized electrical connectors in consistent relative locations and orientations, electrical cables with compatible standardized electrical connectors, etc.), wherein much, if not all, of the grid is positioned adjacent to the surface of a body of water.

While the current disclosure is best applied to a farm of converters (and/or other buoyant devices) that are tethered together by and through shared mooring cables, most, if not all, of which are also positioned adjacent to the surface of a body of water, it is also applicable and of benefit to collections of individually moored converters and/or devices, and such applications and/or embodiments are included within the scope of the present disclosure.

In many of the figures, the mooring cables are not shown so that the electrical cables, their relative gauges, their orientations, etc., will be more clearly illustrated. However, with respect to those figures illustrating farms of the present disclosure, the converters and/or devices are moored. In some embodiments, some or all of the converters are moored, at least in part, through lateral mooring cables, adjacent to the surface of the body of water on which the farm floats, which flexibly and/or elastically connect together adjacent converters, such that the entire farm of converters is moored, at least in part, through the positionally stabilizing forces and/or constraints imposed on the positions of the converters by the surface mooring connectors. In other embodiments, some or all of the converters are individually moored, e.g. through their attachment and/or connection to mooring cables that connect them to one or more anchors. In some embodiments, some of the converters are moored by being operatively connected to anchors. In some embodiments, some of the converters are "moored" (i.e. positionally stabilized) using positional stabilizing thrusters such as water propellers or air propellers (e.g., ducted fans) located on or at the converters. In some embodiments in which positional stabilizing thrusters are used, none of the converters in the farm is operatively connected to an anchor.

Farms of the present disclosure, which contain and/or incorporate electrical grids composed of converters and electrical cables positioned adjacent to the surface of the body of water on which the converters float, may incorporate standardized converters that conform to two or more different designs, numbers and/or types of electrical connectors, varieties of gauges of electrical cables and/or connectors, etc.

Farms of the present disclosure may contain mixtures of buoyant devices and devices, nodes, and/or power-consumers, positioned on, and/or affixed to, land, including land above the water (i.e., shore) and land below the water (i.e., the seafloor).

All variations in numbers, gauges, orientations, types, designs, lengths, and/or other embodiment-specific variations of the general inventive designs, structures, systems, and/or methods disclosed herein are included within the scope of the present disclosure, and will be obvious to those skilled in the art.

DETAILED DESCRIPTION OF THE PREFERRED EMBODIMENTS

Figure 1:
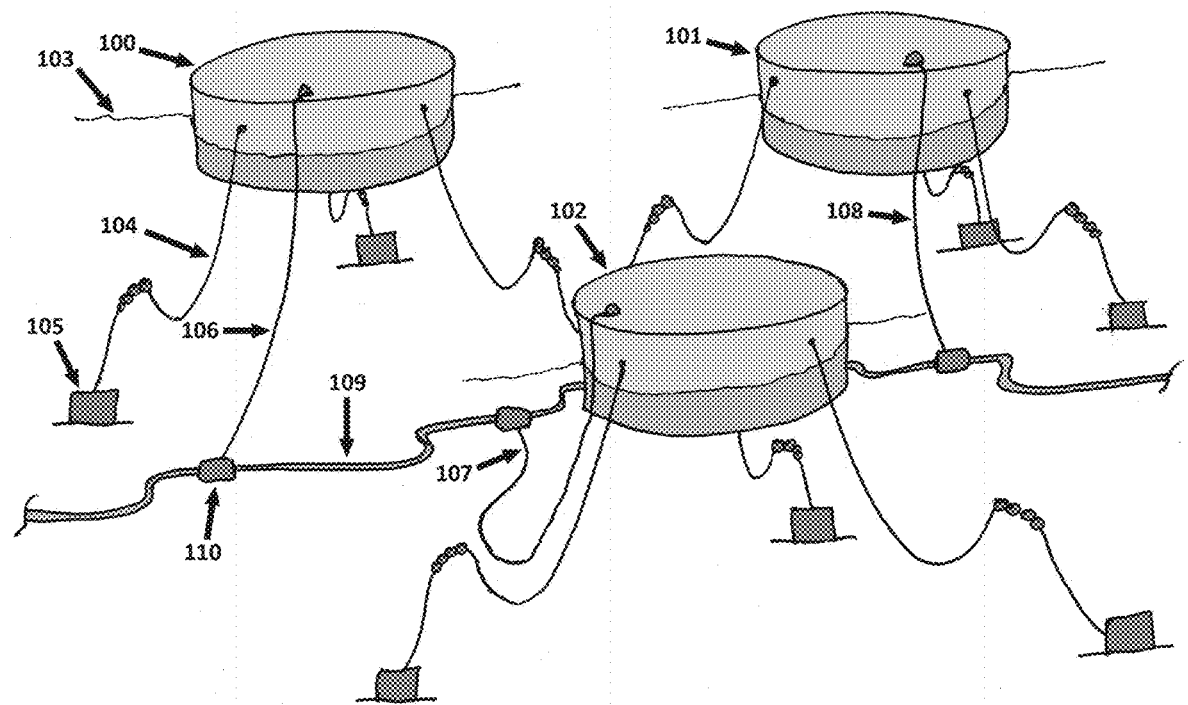
FIG. 1 is a perspective view of a farm of wave energy converters of the prior art.

While much of this disclosure is discussed in terms of farms of wave energy converters, it will be obvious to those skilled in the art that most, if not all, of the disclosure is applicable to, and of benefit with regard to, farms of other types of buoyant devices, e.g., farms of floating wind turbines, and all such applications, uses, and embodiments, are included within the scope of the present disclosure.

While much of this disclosure is discussed in terms of an intra-farm electrical grid whose principle application is the collection, sharing, and/or transmission, of electrical power generated by some or all of the buoyant devices in the farm, it will be obvious to those skilled in the art that most, if not all, of the disclosure is applicable to, and of benefit with regard to, intra-farm electrical grids whose principle applications is the distribution of electrical power to some or all of the buoyant devices in the farm, e.g., the distribution of power from power-generating buoyant devices to power-consuming buoyant devices (such as chemical synthesizing devices) within the farm, and all such applications, uses, and embodiments, are included within the scope of the present disclosure.

While much of this disclosure is discussed in terms of an intra-farm electrical grid whose principle application is the transmission of electrical power generated by some or all of the buoyant devices in the farm to a subsea power cable, it will be obvious to those skilled in the art that most, if not all, of the disclosure is applicable to, and of benefit with regard to, intra-farm electrical grids whose principle application is the transmission of electrical power generated by some or all of the buoyant devices in the farm to other locations, consumers, and/or its utilization for other purposes, and all such applications, uses, and embodiments, are included within the scope of the present disclosure.

The scope of the current disclosure includes features, attributes, characteristics, properties, and/or designs, of wave energy converters and/or other buoyant power generating, power storage, and/or power converting, devices, that include, but are not limited to, embodiments possessing the following:

any number, type, style, design, configuration, size, capacity, and/or maximum rated power level, of the one or more generators and/or alternators;

generators producing any phase, voltage, and/or amperage of alternating current (AC); generators producing any voltage, and/or amperage of direct current (DC);

any number, type, style, design, orientation, and/or other configuration, of electrical connectors (for interconnecting cables);

any number, type, style, design, and/or gauges of connecting conductors within connectors (and associated electrical cables);

conductors, wires, generators, and/or other electrical components, fabricated of any materials; and, conductors, wires, generators, and/or other electrical components, incorporating, utilizing, and/or inclusive of any number, type, style, design, thickness of protective, insulating, outer coatings.

Whenever a wave energy converter of a particular design, generator type, power level, etc., is discussed, the scope of the current disclosure extends as well, and with equal benefit, to other similar and/or analogous devices, e.g., to floating offshore wind turbines. While the geometric aspects of a converter's design, the relative location of its generator, the environmental source of the energy (e.g., waves) that energizes its generator, etc., are different than the respective geometric aspects of a floating wind turbine's design, the relative location of its generator, the environmental source of the energy (e.g., wind) that energizes its generator, etc., with respect to the current disclosure, these are equivalent buoyant energy-harvesting devices and the current disclosure applies with equal benefit to each, and/or to hybrid farms comprised of both.

The scope of the current disclosure includes features, attributes, characteristics, properties, and/or designs, of modular electrical cables and/or connectors, that include, but are not limited to, embodiments possessing the following:

any number, type, style, design, configuration, size, capacity, and/or maximum rated power level, of electrical conductors within a cable;

any number, type, style, design, configuration, size, capacity, and/or maximum rated power level, of electrical connectors on a cable;

any degree of buoyancy, either positive, negative, or neutral; and, any combination of modular electrical cables with other cabling elements so as to impart any other additional functionality, such as also serving as a mooring cable, an attachment point for nets in support of aquaculture, etc.

The scope of the current disclosure includes features, attributes, characteristics, properties, and/or designs, of embodiments of the disclosed farm-level electrical grid, that include, but are not limited to, embodiments which transmit any, and/or all, of the following:

electrical power including, but not limited to: voltages, currents, alternating currents (AC), direct currents (DC), variable direct currents, etc.

data-encoded and/or encoding signals including, but not limited to: digitally-encoded data, analog encoded data, pulse-modulated data, etc.

data characteristic data-sharing networks of types including, but not limited to: LAN, WAN, Wi-Fi, TCP/IP, internet, etc.

The scope of the current disclosure includes features, attributes, characteristics, properties, and/or designs, of embodiments of the disclosed farm-level electrical grid, that include, but are not limited to, embodiments which are consistent with known and unknown grid topologies including, but not limited to:

serial AC;
serial DC;
parallel AC;
parallel DC;
hybrid serial/parallel AC hybrid serial/parallel DC;
any combinations/hybrids of the above;
grids which convert the electrical power of the grid into high-voltage alternating current (HVAC) before transmitting it away from, and/or off, the grid (e.g., through a subsea power cable); and,
grids which convert the electrical power of the grid into high-voltage direct current (HVDC) before transmitting it away from, and/or off, the grid.

FIG. 1 is a perspective view of a farm of wave energy converters of the prior art. Wave energy converters 100, 101, and 102 are floating adjacent to the surface 103 of a body of water, and are each individually anchored, e.g. by mooring cables such as 104 and anchors such as 105, to the seafloor thereunder.

Electrical cables 106, 107, and 108 electrically connect each converter, and/or the electrical power generated by each converter, to a subsea power cable 109. Each individual, converter-specific, electrical cable, e.g. 106, is connected to the subsea power cable 109 via a connector, e.g. 110.

Figure 2:
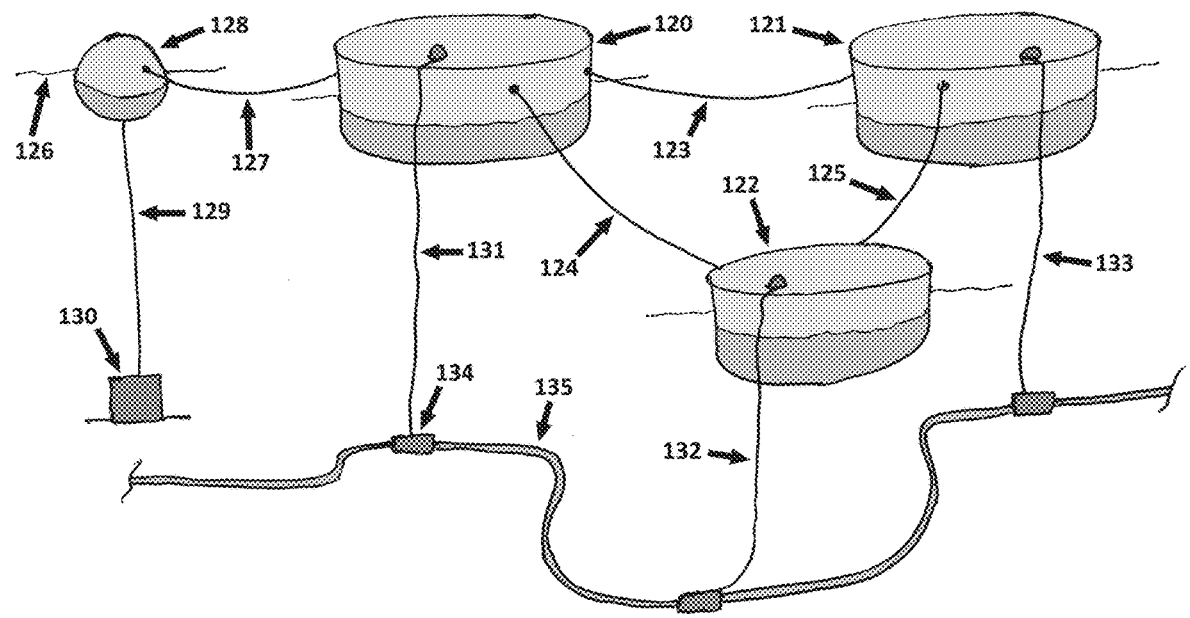
FIG. 2 is a perspective view of a farm of wave energy converters that are tethered together in order to achieve a cooperative mooring, and each converter of which is connected to a subsea power cable via individual cables descending from the converter to the seafloor.

FIG. 2 is a perspective view of a farm of wave energy converters 120, 121, and 122 that are tethered together by mooring cables 123, 124, and 125 adjacent to the surface 126 of the body of water on which the converters float, in order to achieve a cooperative mooring. One of the converters 120 is connected, via a mooring cable 127, to a mooring buoy 128 which is itself connected by a mooring cable 129 to an anchor 130. The converters are connected, via converter-specific electrical cables 131, 132, and 133 to junctions and/or connectors, e.g. 134, in a subsea power cable 135. This farm is not in the prior art. The cooperative mooring of the converters by means of surface mooring cables is disclosed in a separate disclosure. However, the connection of individually-moored and/or anchored converters to a common subsea power cable via individual electrical cables descending from each converter to the seafloor is taught in the prior art.

Figure 3:
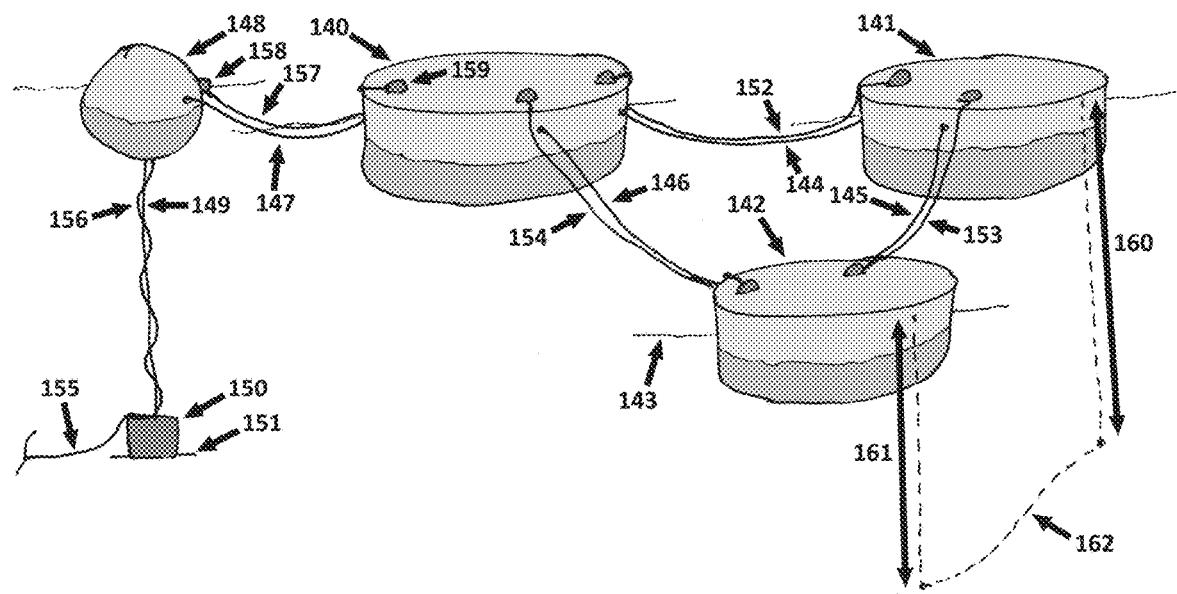
FIG. 3 is a perspective view of a farm of wave energy converters interconnected by both mooring and electrical cables.

FIG. 3 is a perspective view of a farm of the current disclosure, in which wave energy converters are interconnected by both mooring and electrical cables. Wave energy converters 140, 141, and 142 float at the surface 143 of a body of water. The three converters are tethered together by mooring cables 144, 145, and 146, which are positioned adjacent to the surface of the body of water, and may or may not themselves be buoyant and/or supported by buoyant elements and/or floats. Converter 140 is connected, via a mooring cable 147, to a mooring buoy 148 which is itself connected by a mooring cable 149 to an anchor 150 that rests on the seafloor 151.

The converters 140, 141, and 142 are interconnected by electrical cables 152, 153, and 154. Any power which they generate and/or consume is shared, at least in part, within this farm-specific electrical grid. The inter-converter electrical grid formed by electrical cables 152, 153, and 154 is electrically connected to a remote consumer and/or source of electrical power by subsea power cable 155, which ascends to the surface via electrical cable 156, and connects to the farm electrical grid via electrical cable 157, and connectors 158 and 159, on the mooring buoy 148 and the converter 140, respectively. Note that had each converter been individually and/or directly electrically connected to the subsea power cable 155, then, at a minimum, one electrical cable would be required to span the distance between each respective converter at the surface 143 of the body of water and the subsea power cable 155 on the seafloor. For example, the direct connection of converter 141 to the subsea power cable 155 would require at least an electrical cable of length 160. And, the direct connection of converter 142 to the subsea power cable 155 would require at least an electrical cable of length 161. In addition, one or more electrical cables with a combined length of at least 162 would be required to join those "descending" electrical cables 160 and 161 to a single subsea power cable 155 resting on the seafloor and/or buried beneath it.

The electrical farm grid illustrated in FIG. 3 requires a total length of electrical cable that is at least sufficient to interconnect each converter to at least one other converter in an approximately horizontal plane, i.e. adjacent to the surface 143 of the body of water on which the converters float. However, the electrical farm grid illustrated in FIG. 3, requires far less electrical cable than farms (or collectives) of converters of the prior art in that it does not need, and/or saves the resources and/or the costs required to deploy, individual electrical cables of sufficient length to span the vertical distance between each converter and the seafloor (i.e. where additional lengths of cable interconnect each converter to at least one other converter with respect to a horizontal plane, i.e., adjacent to the seafloor, and optionally to a subsea power cable). In other words, whereas farms of converters of the prior art would require a length of electrical cable of at least the sum of lengths 160, 161, and 162 in order to connect converters 141 and 142 to subsea power cable 155, a farm of the current disclosure only requires an electrical cable with a length of 162 (while a single vertical cable 156 would span the gap between the surface grid and the subsea power cable for the entire farm).

Farms of the current disclosure offer many benefits, and eliminate many deficiencies, with respect to those of the prior art. These benefits include, but are not limited to, the following: farms of the current disclosure require less electrical cable, consume fewer electrical-cable resources, are easier and faster to deploy, cost less, and are easier to repair and/or maintain than are farms of the prior art which connect each device floating at the surface of a body of water to a subsea cable positioned adjacent to the seafloor.

Figure 4:
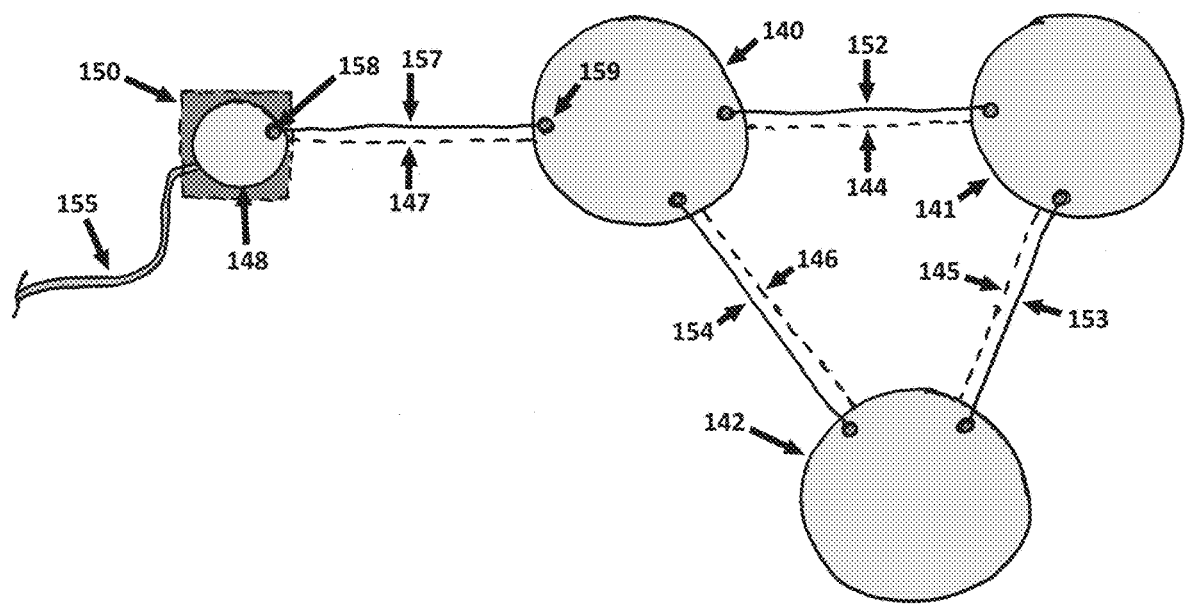
FIG. 4 is a top-down view of the same farm of wave energy converters illustrated in FIG. 3 and interconnected by both mooring and electrical cables.

FIG. 4 is a top-down view of the same farm of wave energy converters illustrated in FIG. 3. The wave energy converters 140, 141, and 142 float on the surface of the body of water. The wave energy converters 140, 141, and 142 are interconnected by both mooring 144, 145, and 146 and electrical 152, 153, and 154 cables. Note that these "mooring" cables 144, 145, and 146 connect the converters to one another, not to the seafloor. Hence, the converters are "moored" by mutual attachment to one another, i.e. mutual attachment is what is meant by "mooring" in this context. In some embodiments, some or all of the converters may additionally be moored by more traditional means such as by attachment to a seafloor anchor. In some embodiments, some or all of the converters may be operatively connected to propulsive units and/or thrusters so as to maintain a designated position on the surface of the body of water. Converter 140 is connected, by mooring cable 147, to mooring buoy 148, which, in turn, is connected to anchor 150. The farm electrical grid, comprised of the three wave energy converters 140, 141, and 142 and the electrical cables 152, 153, and 154 connecting them to one another, is electrically connected to an outlet and/or electrical connector 158 on mooring buoy 148 by electrical cable 157. And, mooring buoy 148 is electrically connected (via an electrical cable not shown) to subsea power cable 155.

Figure 5:
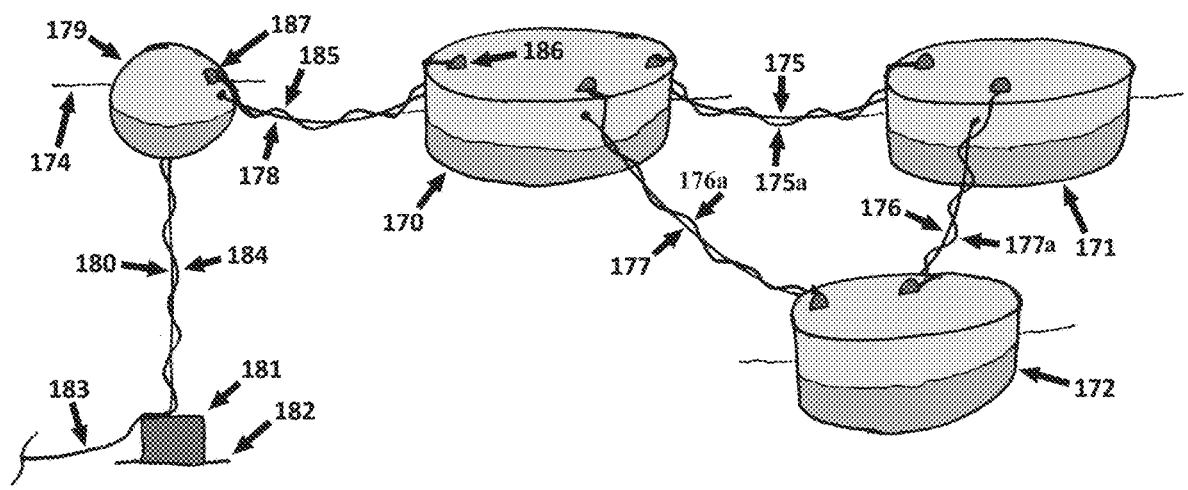
FIG. 5 is a perspective view of a farm of wave energy converters interconnected by both mooring and electrical cables.

FIG. 5 is a perspective view of a farm of the current disclosure, in which wave energy converters are interconnected by both mooring and electrical cables. Wave energy converters 170, 171, and 172 float at the surface 174 of a body of water. The three converters are tethered together by mooring cables 175, 176, and 177, which are positioned adjacent to the surface of the body of water, and may or may not themselves be buoyant and/or supported by buoyant elements and/or floats. Converter 170 is connected, via a mooring cable 178, to a mooring buoy 179 which is itself connected by a mooring cable 180 to an anchor 181 that rests on the seafloor 182. The converters 170, 171, and 172 are interconnected by electrical cables 175, 176, and 177. These interconnecting electrical cables are tethered to, wound around, joined with, and/or otherwise supported by, the associated mooring cables 175, 176, and 177, respectively.

At least some of the power which the converters generate and/or consume is shared within at least some parts of this farm-specific electrical grid. The inter-converter electrical grid formed by electrical cables 175, 176, and 177 is electrically connected to a remote consumer and/or source of electrical power by subsea power cable 183, which ascends to the surface via electrical cable 184, which is, like the inter-converter power cables, tethered to, wound around, joined with, and/or otherwise supported by, the associated mooring cable 180, and connects to the farm electrical grid via electrical cable 185, and connectors 186 and 187, on the mooring buoy 179 and the converter 170, respectively.

Figure 6:
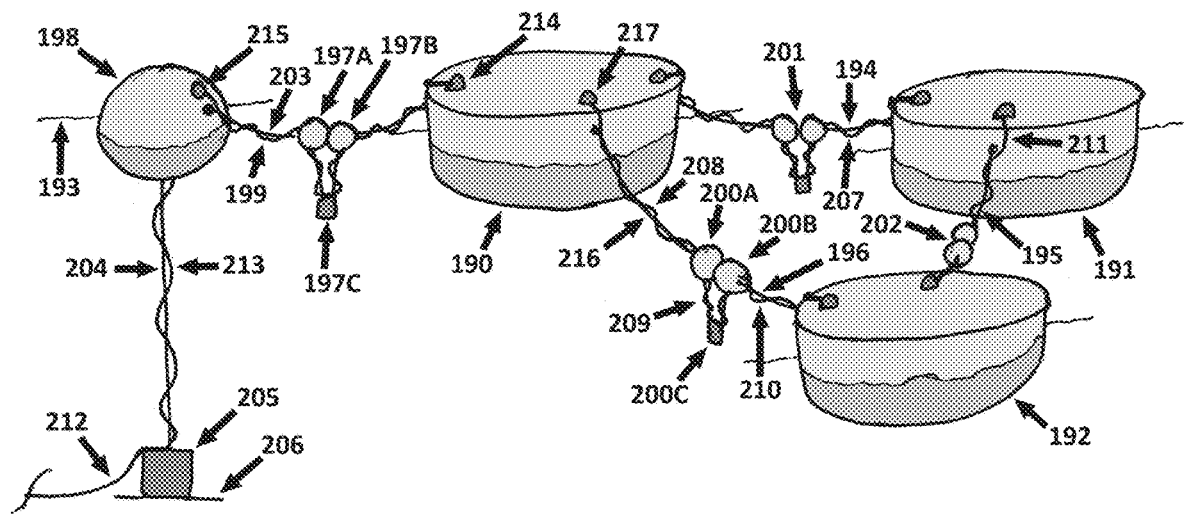
FIG. 6 is a perspective view of a farm of wave energy converters interconnected by tensioning mooring cables and electrical cables.

FIG. 6 is a perspective view of a farm of the current disclosure, in which wave energy converters are interconnected by tensioning mooring cables and electrical cables. Wave energy converters 190, 191, and 192 float at the surface 193 of a body of water. The three converters are tethered together by mooring cables 194, 195, and 196, which are positioned adjacent to the surface of the body of water. These mooring cables are "elastic" in that they allow converters to move apart from one another, over a limited distance, and, when they move further apart than a nominal, default separation distance, "buoyant separation-restoring assemblies" resist that separation, storing potential energy in the process, which they then release as they draw the "over-separated" converters back to a separation distance no greater than their nominal separation distances. Note that different mooring cables in the farm may have different "nominal, default separation distances."

In other words, the mooring cables connecting together different ones of the converters include buoyant separation-restoring assemblies composed of two floats e.g. 197A and 197B and a weight e.g. 197C. When the converters or other buoyant elements at opposite ends of a mooring cable move apart, e.g. when converter 190 and mooring buoy 198 move apart, the floats 197A and 197B of buoyant separation-restoring assembly 197A-B-C are drawn apart, and the weight 197C is lifted, storing gravitational potential energy and increasing the tension in mooring cable 199 and in buoyant separation-restoring assembly 197A-B-C. Accordingly, a separation-restoring force develops that tends to draw converter 190 and mooring buoy 198 back together. Likewise for buoyant separation-restoring assemblies 200A-B-C, 201, and 202. Mooring cables 194, 195, and 196, contain and/or incorporate a single buoyant separation restoring assembly each, i.e. 200A-B-C, 201, and 202, respectively.

Converter 190 is connected, via a tensioning mooring cable 203, i.e. containing and/or incorporating a buoyant separation restoring assembly 197, to a mooring buoy 198 which is itself connected by a mooring cable 204 to an anchor 205 that rests on the seafloor 206. The converters 190, 191, and 192 are interconnected by electrical cables, e.g., 207, 208, 209, 210, 211 and 216. These interconnecting electrical cables are tethered to, wound around, joined with, and/or otherwise supported by, their associated respective tensioning mooring cables 194, 195, and 196 (which connects to connector 217), respectively. Any power, or at least some of the power, which the converters generate and/or consume is shared within at least some parts of this farm-specific electrical grid. The inter-converter electrical grid formed by tensioning mooring cables 194, 195, and 196 is electrically connected to a remote consumer and/or source of electrical power by subsea power cable 212, which ascends to the surface via electrical cable 213, which is, like the inter-converter power cables, tethered to, wound around, joined with, and/or otherwise supported by, the associated mooring cables 204, and connects to the farm electrical grid via electrical cable 199, and connectors 214 and 215, on the converter 190 and the mooring buoy 198, respectively.

Figure 7:
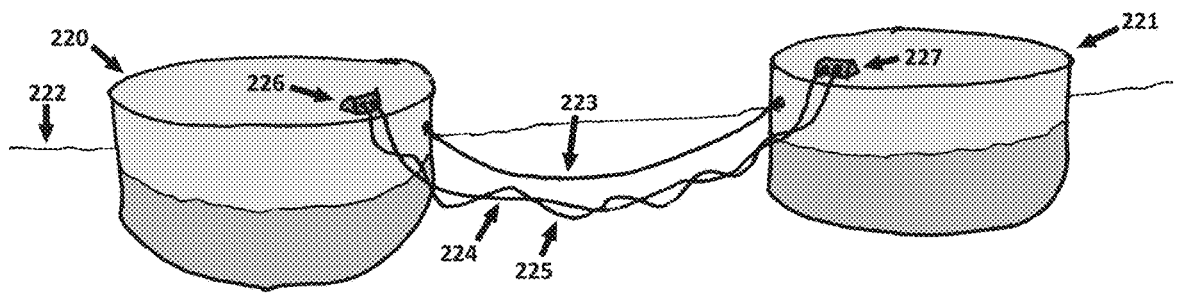
FIG. 7 is a perspective view of a farm of wave energy converters interconnected by both mooring and electrical cables.

FIG. 7 is a perspective view of an embodiment of the current disclosure. A pair of wave energy converters 220 and 221, float adjacent to the surface 222 of a body of water, and are representative of a farm of such devices. The converters are interconnected by both mooring 223 and by a pair 224 and 225 of electrical cables (connected to externally accessible electrical connectors 226 and 227 on the converters). In one embodiment, each of the electrical cables in the pair may be "mono-pole" cables or wires, and one might be dedicated to transmitting electrical voltages and/or currents while the other cables serves as the "ground." Throughout this disclosure "mono-pole" or "monopole" can refer to cables having a single conducting wire, "di-pole" or "dipole" can refer to cables having two mutually insulated conducting wires, and "tri-pole" or "tripole" can refer to cables having three mutually insulated conducting wires.

Figure 8:
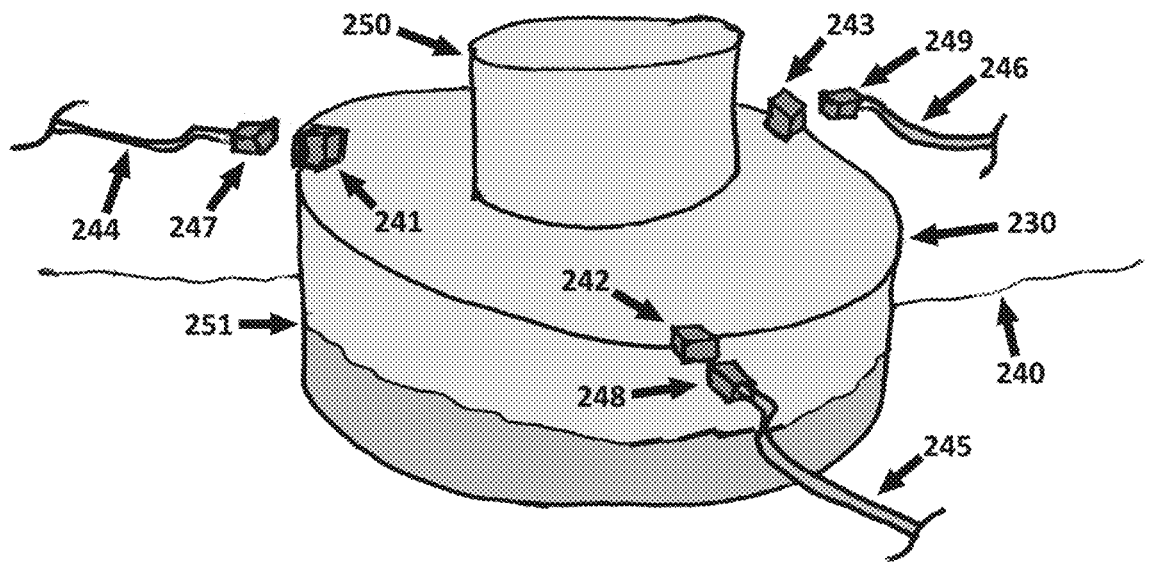
FIG. 8 is a perspective view of a wave energy converter possessing electrical connectors.

FIG. 8 is a perspective view of an embodiment of the current disclosure. A wave energy converter 230 floats at the surface 240 of a body of water up to waterline 251, and possesses, includes, and/or incorporates, three electrical outlets, sockets, plugs, and/or connectors 241, 242, and 243, in this case, equally spaced about the converter's 230 circumference. Each of these electrical outlets and/or connectors is electrically connected to each of the other electrical connectors, such that electrical power, current, signals, impulses, and/or energy, transmitted to any one of them is available for transmission by any one of the others of them. For example, if electrical cables 244, 245, and 246, via their respective connectors 247, 248, and 249, are connected to connectors 241, 242, and 243, respectively, then all three electrical cables would be electrically interconnected, and any electrical potential expressed within, on, and/or through any one of those cables would likewise, be expressed on each and every one of the other of those cables, at least approximately or in part.

The illustrated embodiment 230 possesses a centrally-located electrical power generator (not shown), located inside compartment 250. Any electrical power that the embodiment's generator generates is simultaneously transmitted to and/or through each of the three connectors 241, 242, and/or 243, and to any and all electrical cables connected thereto. In one embodiment, the gauges, and/or electrical power transmission capacities, of the internal wiring which interconnects each of the three connectors 241, 242, and/or 243 within the wave energy converter 230 are the same and support to equal degrees the transmission of electrical signals of no more than the same maximal voltage, current, power, energy, magnitude, and/or level, and, similarly, would be at risk of shorting, failing, and/or "burning out" in response to their exposure to electrical signals exceeding a same, consistent, equal, and/or equivalent, maximal voltage, current, power, energy, magnitude, and/or level.

In another embodiment, the gauges, and/or electrical power transmission capacities, of the internal wiring which interconnects each of the three connectors 241, 242, and/or 243 within the wave energy converter 230 are not the same. Likewise, the gauges, and/or electrical power transmission capacities, of the electrical cables that would match the inherent capacities of the wiring within the converter 230 associated with, and/or connected to, each of the three connectors, differ. While a heavy gauge electrical cable and/or connector (i.e. an electrical cable and/or connector capable of, and/or designed to, safely transmit a relatively great amount and/or level of electrical energy) could be connected to a relatively light gauge electrical connector on the converter, and thereby to correspondingly relatively light gauge electrical wiring inside, this type of mismatch would at best be wasteful of the extra materials and costs associated with heavy gauge cables and connectors, when those heavier gauge components provide no electrical benefit when inherently limited in the range of electrical loads to which they will be exposed by means of relatively lighter gauge connectors and wiring. At worst, the mismatching of components of differing gauges could result in an inadvertent overloading of a converter's internal wiring with a flow of electrical power that exceeds the capacity of that internal wiring.

The use, fabrication, and/or deployment of converters with pre-fabricated, pre-wired, and/or pre-configured, internal wiring architectures offers many benefits, among them are included, though not limited to:

Converters of a consistent and/or standard design facilitate large-scale fabrication.

Converters that simultaneously connect the output of their generator(s) to each of a set of standardized external electrical plugs, connectors, outlets, and/or interfaces, facilitate the design, planning, construction, deployment, and/or fabrication, of interconnected farms of such converters.

Especially when coupled with external electrical cables of standardized lengths and connectors, plugs, and/or outlets, the creation of a surface-level farm electrical grid of the kind disclosed herein is greatly facilitated through the linking together of standardized, pre-wired converters with simple, potentially standardized and/or commoditized, electrical cables. The need to directly connect customized power cables to the actual generators that power them is eliminated, and is replaced with a simple "snapping together" of standardized electrical cables, and/or the respective plugs and sockets therein, with standardized electrical plugs, sockets, and/or connectors on the corresponding respective converters, thereby significantly speeding the deployment of such converters in adverse marine environments—definitely saving time and money, and potentially saving lives.

The potentially problematic troubleshooting and/or debugging of electrical connections between external power cables and internal generators and/or other electronics within a wave energy converter may be performed in the well-equipped, efficient, and relatively safe, environment of a factory, instead of at sea, on a moving deck, and the potential for dropped tools shorting high-voltage contacts. The illustrated wave energy converter 230 includes and/or incorporates three electrical plugs, sockets, and/or connectors 241, 242, and 243 to which electrical cables may be connected and/or joined. However, the number of such connectors is arbitrary. The scope of the current disclosure includes embodiments that include and/or incorporate 1, 2, 3, 4, 5, 6, 7, 8, and/or any number, of such electrical connectors.

The scope of the current disclosure includes embodiments possessing and/or incorporating internal electrical cables and connectors of any and all gauges, types, styles, designs, characteristics, materials, forms, and/or capacities. It also includes embodiments possessing and/or incorporating internal cables and connectors of any and all numbers of wires, conductors, conduits, supporting electronics (e.g. capacitors), and/or insulators. In the same way that the scope of the current disclosure includes all manner, number, style, and capacity of internal electrical cables, wires, and connectors, so too it includes the corresponding and/or related matching, appropriate, and/or optimal, external electrical cables and connectors that would best couple and/or co-transmit with those internal electrical cables and connectors. The scope of the current disclosure includes all manner, number, style, and capacity of internal electrical cables, wires, and connectors, even within the same types of wave energy converters and/or embodiments. The scope of the current disclosure includes embodiments with any and all numbers of external electrical connectors available for connection to external electrical cables within the context and/or formation of a surface farm electrical grid. It also includes embodiments manifesting, and/or incorporating, inter-connector angular separations, and/or connector distributions, and/or patterns of distribution, about a converter and/or embodiment perimeter and/or circumference.

The scope of the current disclosure includes embodiments with connectors located at any position, orientation, and/or elevation, with respect to an embodiment and/or converter. Connectors, even within, in, and/or on, the same embodiment and/or converter may be positioned at an upper surface of the embodiment (i.e. when in a nominal floating orientation), adjacent to a surface of the body of the water on which the embodiment floats, below a surface of the body of the water on which the embodiment floats, etc. Connectors may be oriented so as to receive and/or mate with an electrical cable and/or its connector in a lateral and/or horizontal direction, in a vertical direction, and/or any other direction. Connectors may be oriented so as to receive and/or mate with an electrical cable and/or its connector from a direction parallel to a single axis with respect to an embodiment, e.g. parallel to a lateral axis, parallel to a vertical axis, parallel to a lateral radial axis, etc., and/or they may be oriented so as to receive and/or mate with an electrical cable and/or its connector from a same specific direction (e.g. relative to "north" at a deployment site).

The scope of the current disclosure includes embodiments with connectors that are rigidly and immovably affixed to a surface and/or part of the embodiment. It also includes embodiments with connectors that are flexibly connected to a surface and/or part of the embodiment. It also includes embodiments with connectors that are connected and/or tethered to ends of electrical cables that are loose, e.g. one end or portion of which is affixed to the embodiments. Such "tethered connectors" are therefore able to be connected to mating electrical cables a distance from the converter, which may be advantageous in some contexts and/or circumstances.

The scope of the current disclosure includes embodiments without "connectors" per se, in which the "connectors" referenced throughout this disclosure are instead and/or in fact bare wires, wires stabilized, exposed, prepared, and/or required for connections based on, and/or accomplished by means of, splicing, soldering, crimping, and/or other manners, techniques, procedures, structures, devices, fittings, that facilitate and/or accomplish their joining to, and/or with, another (e.g. external) electrical cable, wire(s), conductor(s), and/or other conductive material, extrusion, projection, interface, and/or surface.

Figure 9:
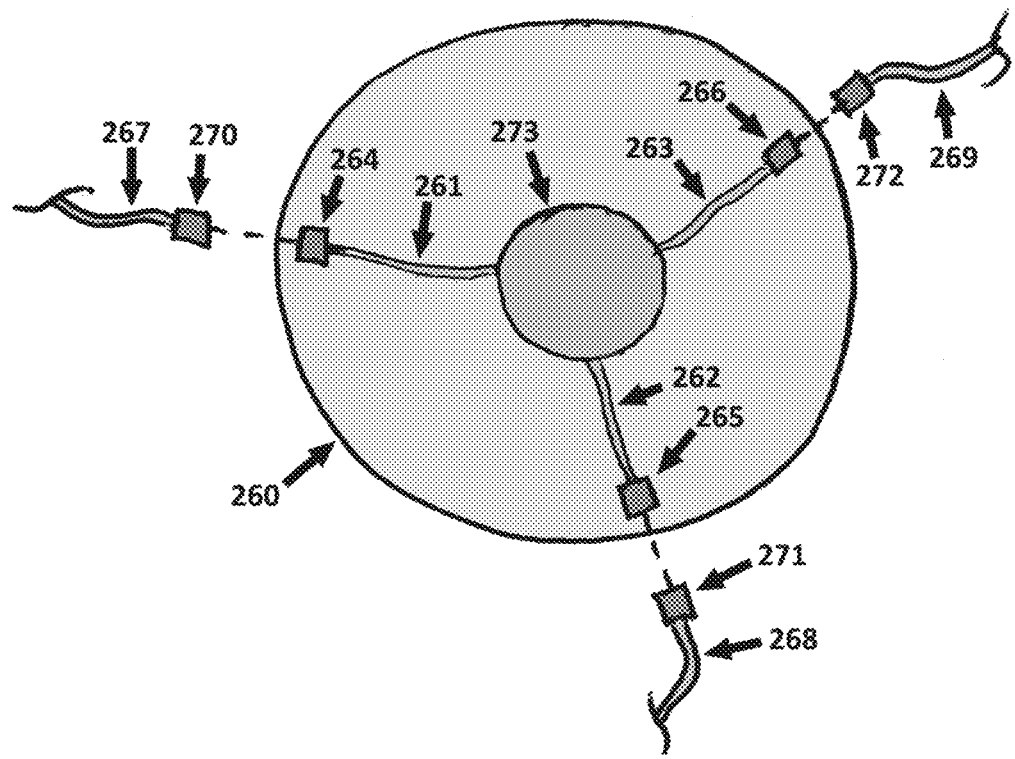
FIG. 9 is a top-down view of a wave energy converter possessing electrical connectors.

FIG. 9 is a top-down view of an embodiment of the current disclosure. A wave energy converter 260 possesses internal wiring (visualized through an upper surface of the embodiment for the purpose of illustration) that includes at least three cables 261, 262, and 263, wires, conductors, and/or other conductive elements, that are electrically connected to one another. Each of these three internal electrical cables is terminated with a respective connector 264, 265, and 266. These three internal cables 261, 262, and 263, and their respective connectors 264, 265, and 266, facilitate the creation of an electrical grid within a farm of similar devices by electrically interconnecting any external electrical cables, e.g. 267, 268, and/or 269, and/or the connectors on those external electrical cables, e.g. 270, 271, and/or 272, respectively, connected to any and/or all of these electrically interconnected electrical connectors on the wave energy converter.

In an embodiment, one or more wave-driven and/or excited generators within the wave energy converter 260, e.g., within a central chamber 273, are electrically connected to the three internal electrical cables 261, 262, and 263, and therethrough to their respective connectors 264, 265, and 266. At least a portion of any electrical power generated by those generators is transmitted to those cables and connectors, and, if any or all of those connectors are electrically connected a farm-level electrical grid via external cables, e.g. 267, and/or connectors, e.g. 270, then at least a portion of the electrical power generated by those generators is transmitted to the farm-level grid.

In an embodiment of the farm disclosed herein, at least a portion of the external electrical cables within the farm-level grid, e.g. 267, are positioned adjacent to the surface of the body of water on which the farm's converters float. This modular grid, i.e. composed of detachable external electrical cables and detachable pre-wired wave energy converters, all floating and/or buoyantly held adjacent to the surface of the body of water on which the farm floats, greatly simplify the deployment, inspection, maintenance, repair, and/or replacement, of any or all of a farm's electrical grid components and/or modules, thereby reducing costs, delays, and/or injuries.

Figure 10:
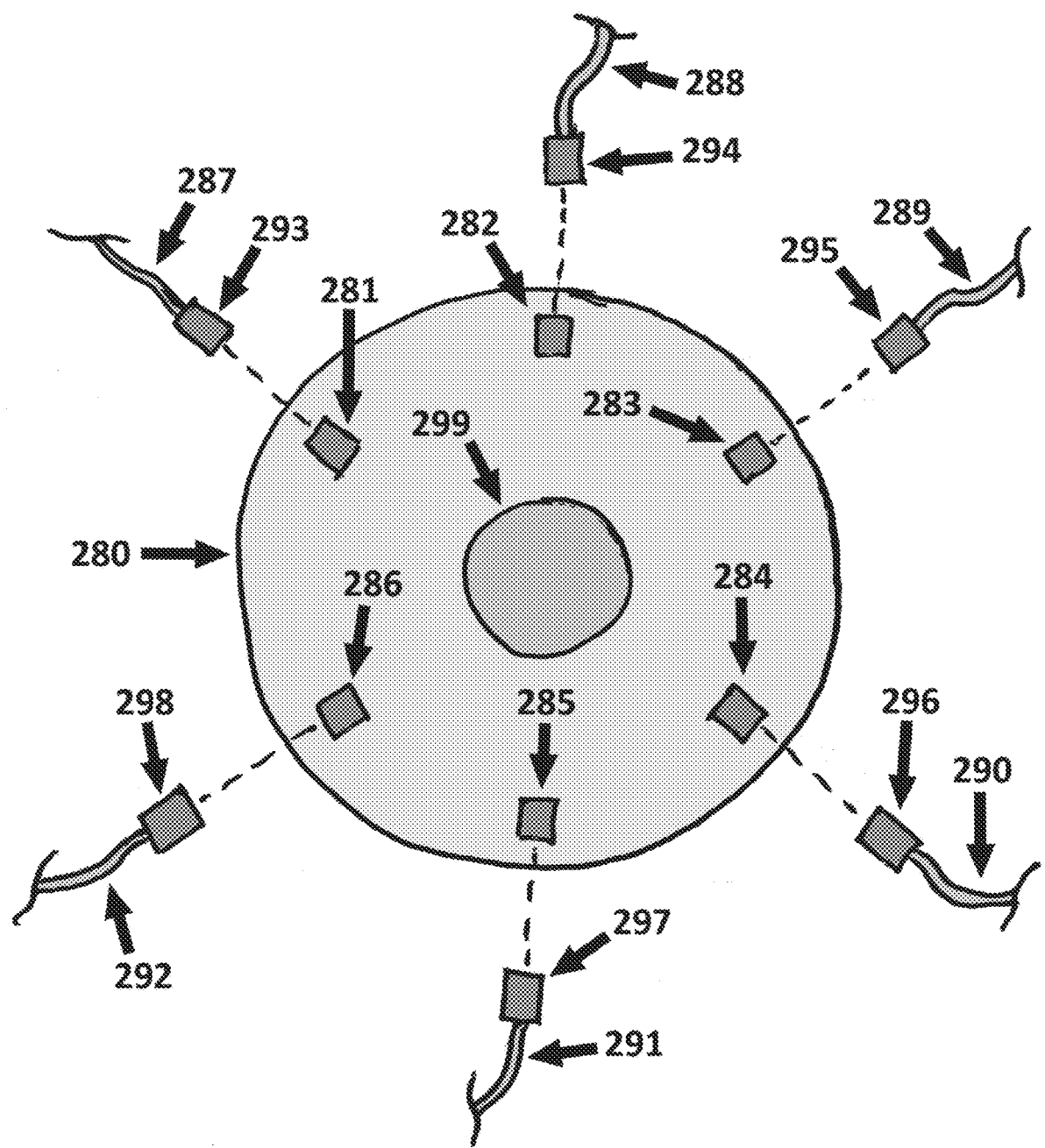
FIG. 10 is a schematic view of a wave energy converter possessing electrical connectors.

FIG. 10 is a top-down view of an embodiment of the current disclosure. A wave energy converter 280, having a covering surface 299 similar to covering surface 309 in FIG. 11, possesses and/or incorporates six externally-accessible electrical connectors 281-286, through which respective external electrical cables 287-292 and/or their respective connectors 293-298 such as might be used to create and/or establish an electrical grid within a farm of wave energy converters, may be and/or may become electrically connected to the interconnected electrical cables and/or grid inside and/or within the wave energy converter, and/or to the one or more generators, and/or to the electrical power generated, therein.

Figure 11:
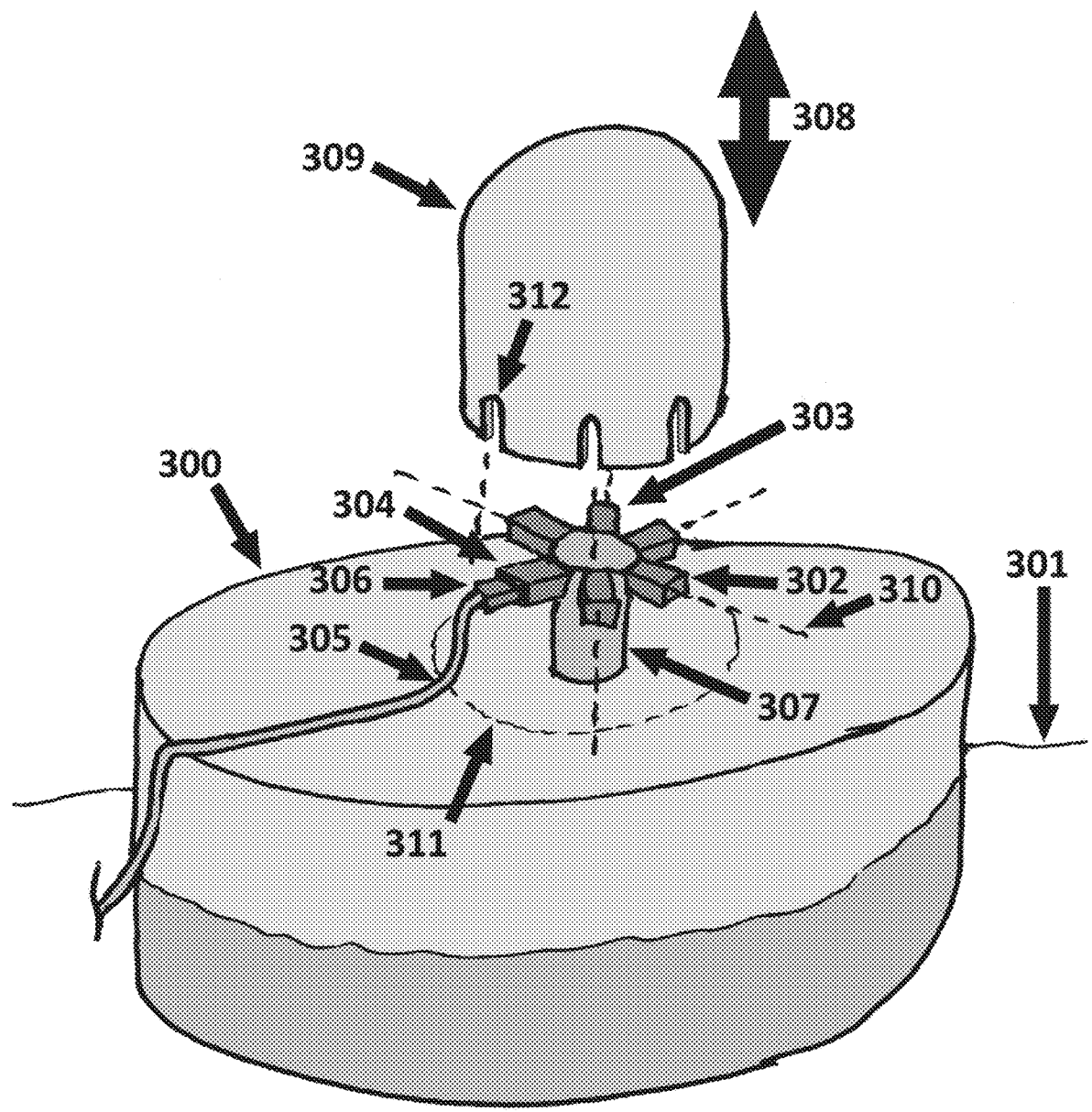
FIG. 11 is a top-down view of a wave energy converter possessing electrical connectors at a hub which may be covered.

FIG. 11 is a top-down view of an embodiment of the current disclosure. A wave energy converter 300 floats adjacent to the surface 301 of a body of water. It possesses externally accessible electrical connectors, e.g. 302, 303, and 304, to which, and/or through which, external electrical cables, e.g. 305, and/or their respective electrical plugs, sockets, and/or connectors, e.g. 306, may be and/or become electrically connected to the wiring and/or to the generator(s) inside the wave energy converter.

This embodiment's externally accessible electrical connectors, e.g. 302, 303, and 304, are affixed to, and/or incorporated within, a central hub 307 mounted to upper surface 310, and access to those connectors is gained through the removal 308 and/or lifting of a covering surface 309 and/or lid. After external electrical cables, e.g. 305, and/or their respective connectors, e.g. 306, are attached and/or detached from the converter's externally accessible electrical connectors, e.g. 304, the converter's covering surface 309 and/or lid may be replaced 308 and/or secured to the converter. Such a covering surface 309 and/or lid may protect the electrical connectors therein from excessive exposure to seawater. Such a covering surface 309 may include a seal 311 between an upper surface of the embodiment and a lower surface of the covering, and it may include notches e.g., 312, that allow the passage of cables while minimizing the space(s) through which water may enter the inside of the covering, when in its lowered configuration.

Figure 12:
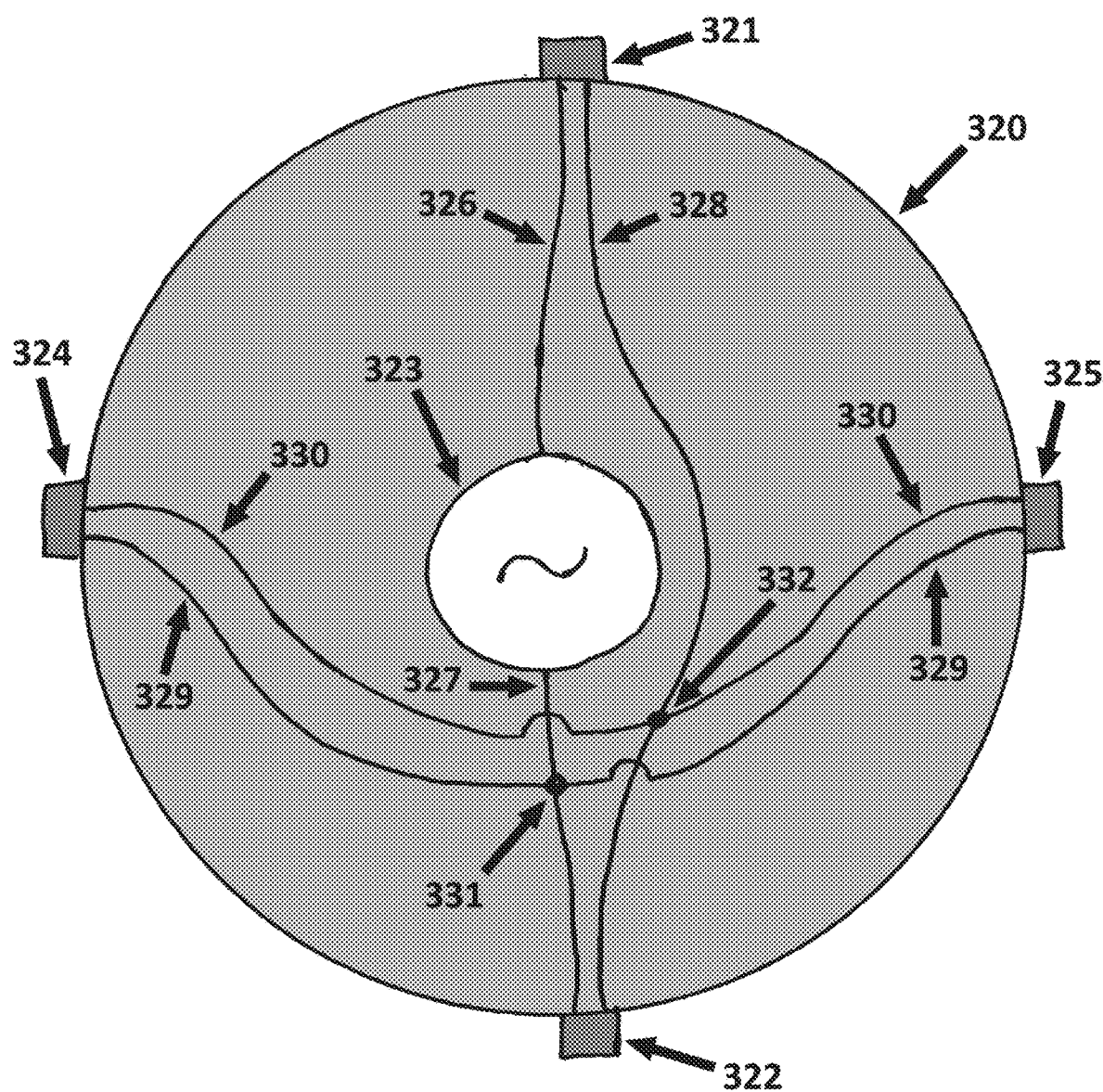
FIG. 12 is a top-down symbolic and/or schematic view of a wave energy converter prefabricated to include two connectors that will connect a generator in the converter in a serial fashion, and two connectors that provide parallel connections to the generator's serial wiring circuit.

FIG. 12 is a top-down symbolic and/or schematic view of an embodiment of the current disclosure. The wave energy converter 320 is designed and/or fabricated to include two connectors 321 and 322 that connect to a generator 323 within the converter 320 in a serial fashion, and two connectors 324 and 325 that provide parallel connections to the generator's serial wiring circuit. One contact (i.e. an electrical contact, conductor, electrode, wire, and/or interface) within connector 321 is connected to wire 326. Wire 326 is connected to one of two output contacts on a generator 323 that generates a single phase alternating current. The other of the generator's two output contacts is connected to wire 327. When the circuit composed in part by wires 326 and 327, and generator 323 is closed, as through the short circuiting of each respective pair of wires (e.g., 326 and 328) connected to connectors 321 and 322, or, preferably, through the incorporation of converter 320 within a larger circuit in which wire 328 may serve as a portion of an electrical connection to the far end of the circuit (i.e. to the output of the last generator in the series), then the alternating current generated by generator 323 may be combined, in a serial fashion, with the alternating currents, if any, generated by other such generators, in other such converters.

Connectors 324 and 325 provide parallel electrical connections to the serial circuit composed of wires 326 and 327, generator 323, and (after completion of a grid circuit) wire 328. The parallel connection wires 329 and 330 are connected (in parallel) to the serial circuit 327 and 328 at respective junctions 331 and 332. Such parallel connections will allow the current of two or more power-generating circuits (e.g. two or more serially-connected sets of converter generators) to be combined in preference to the voltage. Whereas serial connections will tend to increase the voltages of the combined electrical power signals in preference to the currents thereof.

Another wave energy converter embodiment of the current disclosure possesses electrical connectors that provide serial electrical connections to the embodiment's one or more generators of two-phase alternating current. Another converter embodiment of the current disclosure possesses electrical connectors that provide serial electrical connections to the embodiment's one or more generators of three-phase alternating current.

The converter illustrated in FIG. 12 is a simplified illustration offered for the sake of explanation and understanding, and may omit one or more components, features, elements, connections, and/or circuits, that will be desirable, optimal, preferable, required, and/or essential, with respect to every practical and/or functional surface-grid-connected farm of converters, and/or with respect to particular context-, environmental-, and/or operationally-specific deployments of surface-grid-connected farms of converters. All such additional components, features, elements, connections, and/or circuits, will be obvious to those skilled in the art, and are included within the scope of the present disclosure.

Figure 13:
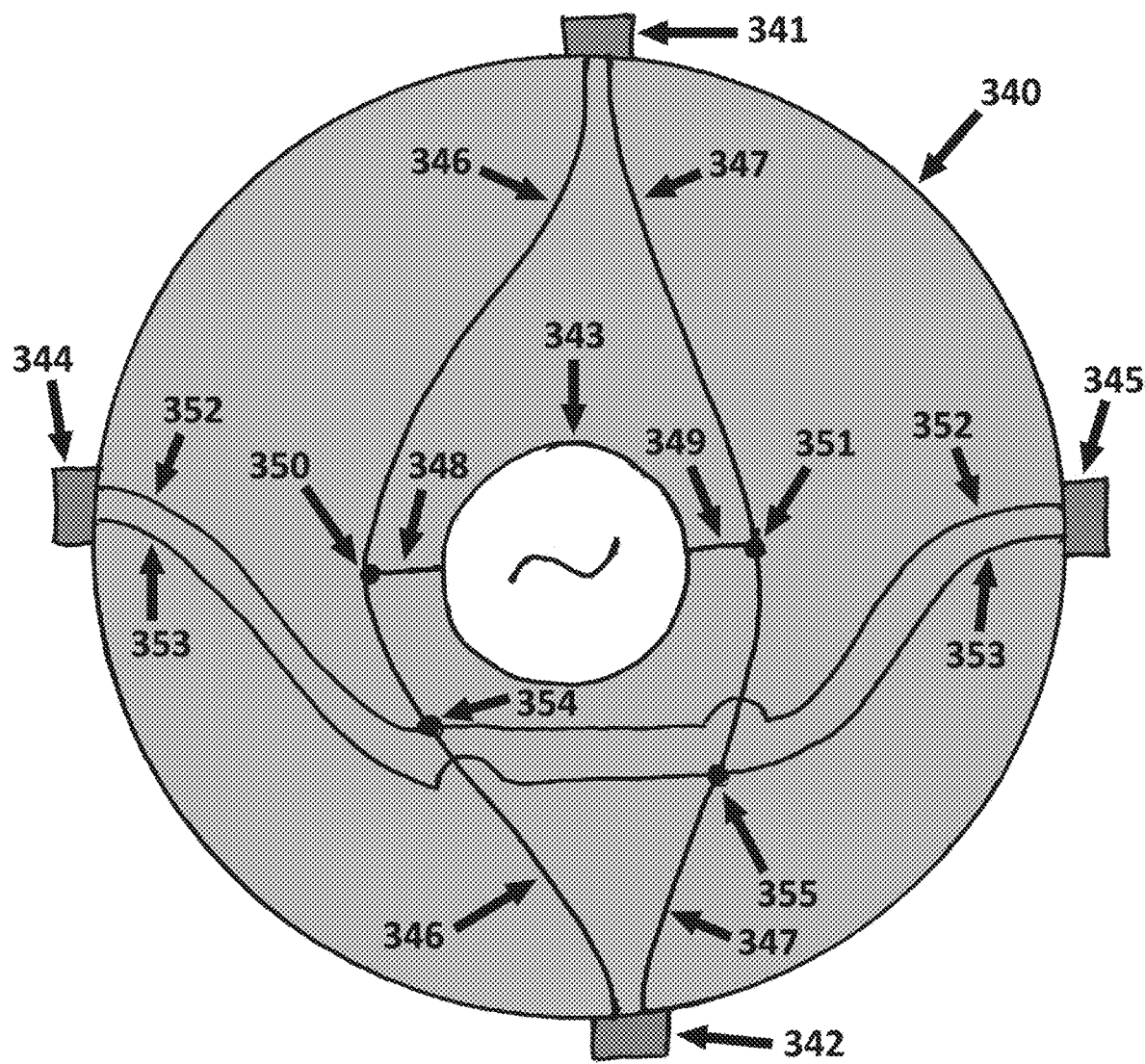
FIG. 13 is a top-down symbolic and/or schematic view of a wave energy converter prefabricated to include two connectors that will connect a generator in the converter in a parallel fashion, and two connectors that provide additional parallel connections to the generator's wiring circuit.

FIG. 13 is a top-down symbolic and/or schematic view of an embodiment of the current disclosure. The wave energy converter 340 is designed and/or fabricated to include two connectors 341 and 342 that connect to a generator 343 within the converter 340 in a parallel fashion, and two connectors 344 and 345 that provide additional parallel connections to the generator's wiring circuit. The two contacts within each connector 341 and 342 are connected to wires 346 and 347, respectively. Those wires are connected, in parallel, via wires 348 and 349, respectively, and connections 350 and 351, respectively, with the single-phase alternating current output of the generator 343. Connectors 344 and 345 provide additional parallel electrical connections to the output of generator 343. The parallel connection wires 352 and 353 are connected (in parallel) to the parallel circuit 346 and 347 at junctions 354 and 355, respectively. Such parallel connectors and connections will facilitate the sharing and/or combination of the current generated by this, and many additional, converter generated-power circuits.

Another wave energy converter embodiment of the current disclosure possesses electrical connectors that provide parallel electrical connections to the embodiment's one or more generators of two-phase alternating current. Another converter embodiment of the current disclosure possesses electrical connectors that provide parallel electrical connections to the embodiment's one or more generators of three-phase alternating current.

The converter illustrated in FIG. 13 is a simplified illustration offered for the sake of explanation and understanding, and may omit one or more components, features, elements, connections, and/or circuits, that will be desirable, optimal, preferable, required, and/or essential, with respect to every practical and/or functional surface-grid-connected farm of converters, and/or with respect to particular context-, environmental-, and/or operationally-specific deployments of surface-grid-connected farms of converters. All such additional components, features, elements, connections, and/or circuits, will be obvious to those skilled in the art, and are included within the scope of the present disclosure.

Figure 14:
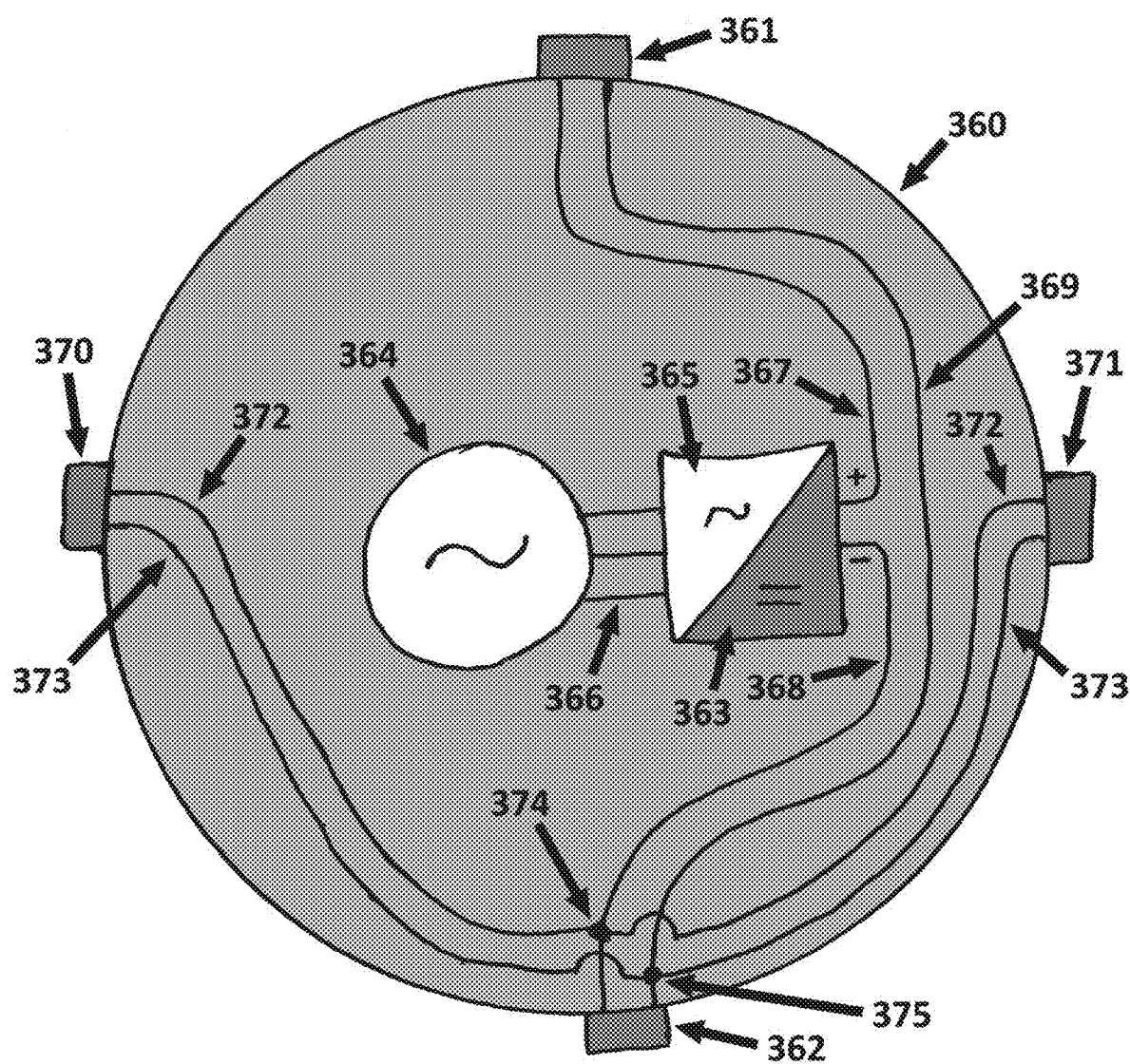
FIG. 14 is a top-down symbolic and/or schematic view of a wave energy converter prefabricated to include two connectors that will connect a generator in the converter in a serial fashion, and two connectors that provide parallel connections to the generator's serial wiring circuit.

FIG. 14 is a top-down symbolic and/or schematic view of an embodiment of the current disclosure. The wave energy converter 360 is designed and/or fabricated to include two connectors 361 and 362 that connect to the output 363 of a rectifier (i.e. an electronic component and/or device that transforms an incident alternating current, i.e. an electrical signal oscillating between positive and negative voltages, into a variable direct current, i.e. an electrical signal of a single voltage polarity). A three-phase alternating current generator 364 inputs, to the receiving end 365 of the rectifier, three alternating current electrical signals on electrical connections 366.

One contact (i.e. an electrical contact, conductor, electrode, wire, and/or interface) within connector 361 is connected to wire 367. Wire 367 is connected to one of two output contacts (i.e. the positive voltage polarity contact) on the output 363 of rectifier 365/363. The other of the rectifier's two output contacts (i.e. the negative voltage polarity contact) is connected to wire 368. When the circuit composed in part by wires 367 and 368, and rectifier 363 (and generator 364) is closed, as through the short circuiting of the respective contacts within connectors 361 and 362, or, preferably, through the incorporation of converter 360 within a larger grid and/or circuit in which wire 369 may serve as a portion of an electrical connection to the far end of the circuit (i.e. to the output of the last rectifier in the series), then the direct current generated by rectifier 363 may be combined, in a serial fashion, with the direct currents, if any, generated by other such rectifiers (and generators), in other such converters.

Connectors 370 and 371 provide parallel electrical connections to the serial circuit composed of wires 367 and 368, rectifier 363, and (after completion of a grid circuit) wire 369. The parallel connection wires 372 and 373 are connected (in parallel) to the serial circuit 368 and 369 at respective junctions 374 and 375. Such parallel connections will allow the current of two or more power-generating circuits (e.g. two or more serially-connected sets of converter rectifiers) to be combined in preference to the voltage. Whereas serial connections will tend to increase the voltages of the combined electrical power signals in preference to the currents thereof. Another wave energy converter embodiment of the current disclosure possesses electrical connectors that provide parallel electrical connections to the embodiment's one or more rectifiers which rectify two-phase alternating currents. Another converter embodiment of the current disclosure possesses electrical connectors that provide parallel electrical connections to the embodiment's one or more rectifiers which rectify single-phase alternating currents.

The converter illustrated in FIG. 14 is a simplified illustration offered for the sake of explanation and understanding, and may omit one or more components, features, elements, connections, and/or circuits, that will be desirable, optimal, preferable, required, and/or essential, with respect to every practical and/or functional surface-grid-connected farm of converters, and/or with respect to particular context-, environmental-, and/or operationally-specific deployments of surface-grid-connected farms of converters. All such additional components, features, elements, connections, and/or circuits, will be obvious to those skilled in the art, and are included within the scope of the present disclosure.

Figure 15:
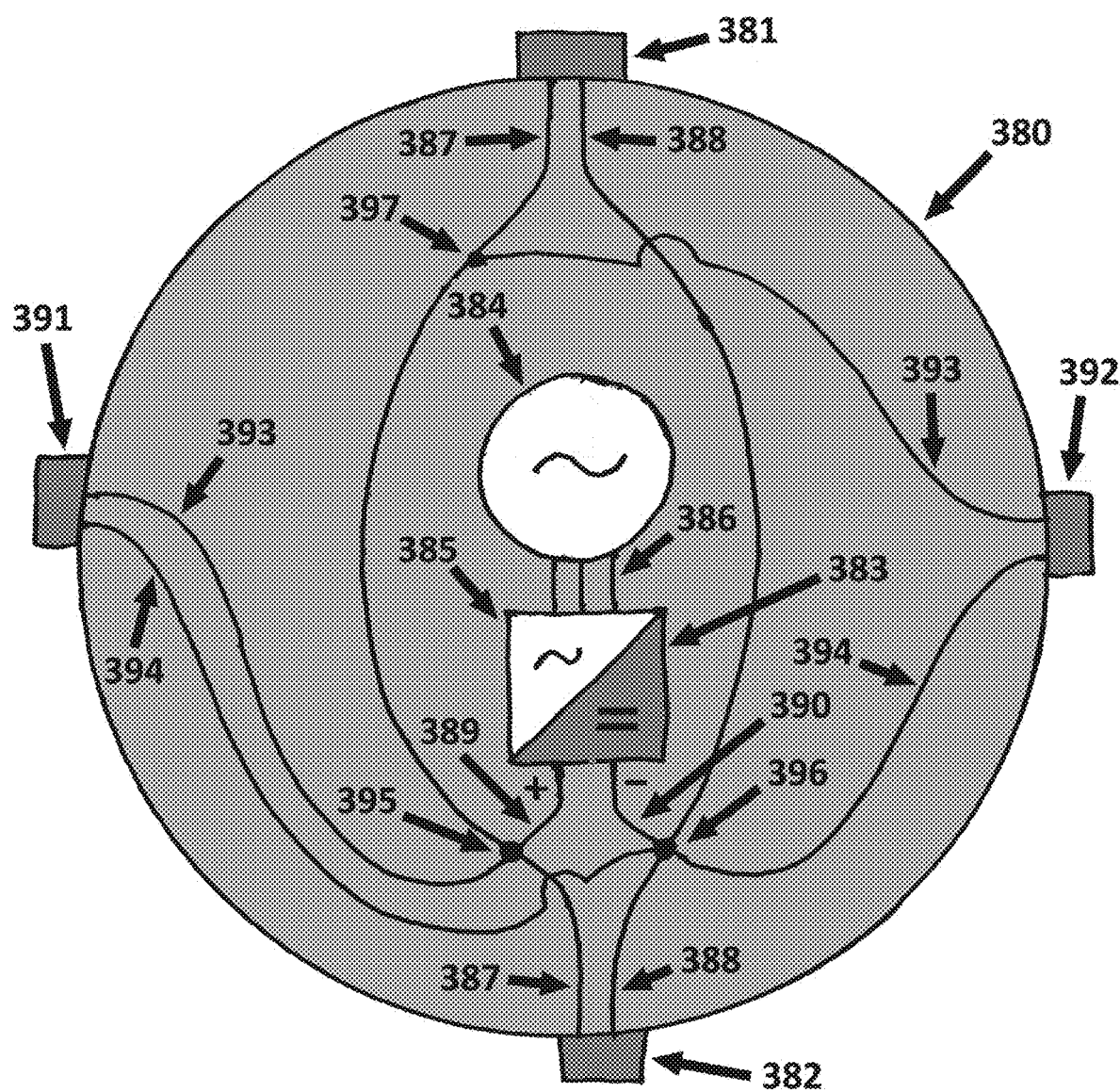
FIG. 15 is a top-down symbolic and/or schematic view of a wave energy converter prefabricated to include two connectors that will connect a rectifier, and a connected generator, in the converter in a parallel fashion, and two connectors that provide additional parallel connections to the generator's wiring circuit.

FIG. 15 is a top-down symbolic and/or schematic view of an embodiment of the current disclosure. The wave energy converter 380 is designed and/or fabricated to include two connectors 381 and 382 that connect to the output 383 of a rectifier (i.e. an electronic component and/or device that transforms an incident alternating current, i.e. an electrical signal oscillating between positive and negative voltages, into a variable direct current, i.e. an electrical signal of a single voltage polarity). A three-phase alternating current generator 384 inputs, to the receiving end 385 of the rectifier, three alternating current electrical signals on electrical connections 386. Each pair of contacts within each connector 381 and 382 is connected to wires 387 and 388, respectively.

Those wires are connected, in parallel, via wires 389 and 390, respectively, and connections 395 and 396, respectively, with the rectified (i.e. direct current) three-phase alternating output of the generator 384.

Connectors 391 and 392 provide additional parallel electrical connections to the output of rectifier 383. The parallel connection wires 393 and 394 are connected (in parallel) to the parallel circuit 387 and 388 at respective junctions 395/397 and 396. The Such parallel connectors and connections will facilitate the sharing and/or combination of the current generated by this, and many additional, converter generated-power circuits.

Another wave energy converter embodiment of the current disclosure possesses electrical connectors that provide parallel electrical connections to the embodiment's one or more rectifiers which rectify two-phase alternating currents. Another converter embodiment of the current disclosure possesses electrical connectors that provide parallel electrical connections to the embodiment's one or more rectifiers which rectify single-phase alternating currents.

The converter illustrated in FIG. 15 is a simplified illustration offered for the sake of explanation and understanding, and may omit one or more components, features, elements, connections, and/or circuits, that will be desirable, optimal, preferable, required, and/or essential, with respect to every practical and/or functional surface-grid-connected farm of converters, and/or with respect to particular context-, environmental-, and/or operationally-specific deployments of surface-grid-connected farms of converters. All such additional components, features, elements, connections, and/or circuits, will be obvious to those skilled in the art, and are included within the scope of the present disclosure.

Figure 16:
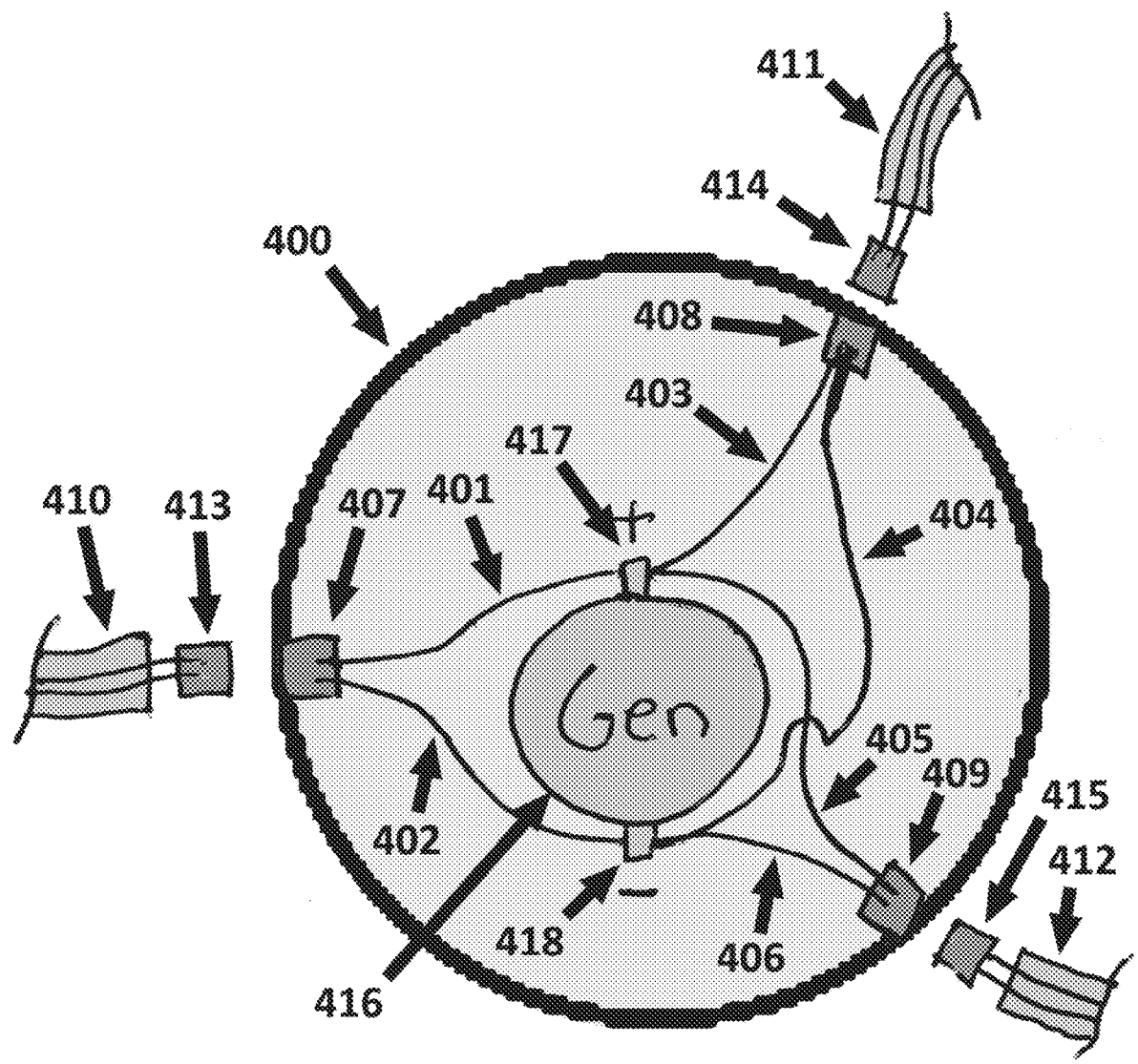
FIG. 16 is a top-down symbolic and/or schematic view of a wave energy converter prefabricated to include three connectors that will connect a generator in the converter in a parallel fashion.

FIG. 16 is a schematic top-down view of an embodiment of the current disclosure. A wave energy converter 400 possessing internal electrical cables 401-406, wires, and/or conductors, as well as externally accessible electrical outlets 407-409, connectors, interfaces, and/or electrical access points and/or conductors, through which external electrical cables, e.g. 410-412, and/or their respective plugs, and/or connectors, e.g. 413-415, can be and/or can become electrically connected to those respective internal electrical cables.

A generator 416 is electrically connected to the converter's internal electrical cables, e.g. 401 and 402, and/or to its internal electrical grid, at respective generator connection points 417 and 418. At least in part in response to its wave-induced movements, the generator 416 generates electrical power that is, at least in part, transmitted to the wave energy converter's internal electrical cables, e.g. 401 and 402, and/or to its internal electrical grid. A portion of the generator's electrical power will also be transmitted, shared, and/or otherwise communicated to and/or through, any and all external electrical cables, e.g. 410, and/or their plugs and/or connectors, e.g. 413, when and if they become are electrically connected to one or more of the wave energy converter's externally accessible electrical outlets 407-409, connectors, interfaces, and/or electrical access points and/or conductors.

One wave energy converter embodiment of the current disclosure possesses electrical outlets and/or connectors, e.g., 407, that provide parallel electrical connections to the rectified electrical output of the embodiment's one or more three-phase alternating current generators. Another wave energy converter embodiment of the current disclosure possesses electrical connectors that parallel electrical connections to the rectified electrical output of the embodiment's one or more two-phase alternating current generators. Another converter embodiment of the current disclosure possesses electrical connectors that provide parallel electrical connections to the rectified electrical output of the embodiment's one or more single-phase alternating current generators. Another converter embodiment of the current disclosure possesses electrical connectors that provide parallel electrical connections to the electrical output of the embodiment's one or more direct current generators.

The converter illustrated in FIG. 16 is a simplified illustration offered for the sake of explanation and understanding, and may omit one or more components, features, elements, connections, and/or circuits, that will be desirable, optimal, preferable, required, and/or essential, with respect to every practical and/or functional surface-grid-connected farm of converters, and/or with respect to particular context-, environmental-, and/or operationally-specific deployments of surface-grid-connected farms of converters. All such additional components, features, elements, connections, and/or circuits, will be obvious to those skilled in the art, and are included within the scope of the present disclosure.

Figure 17:
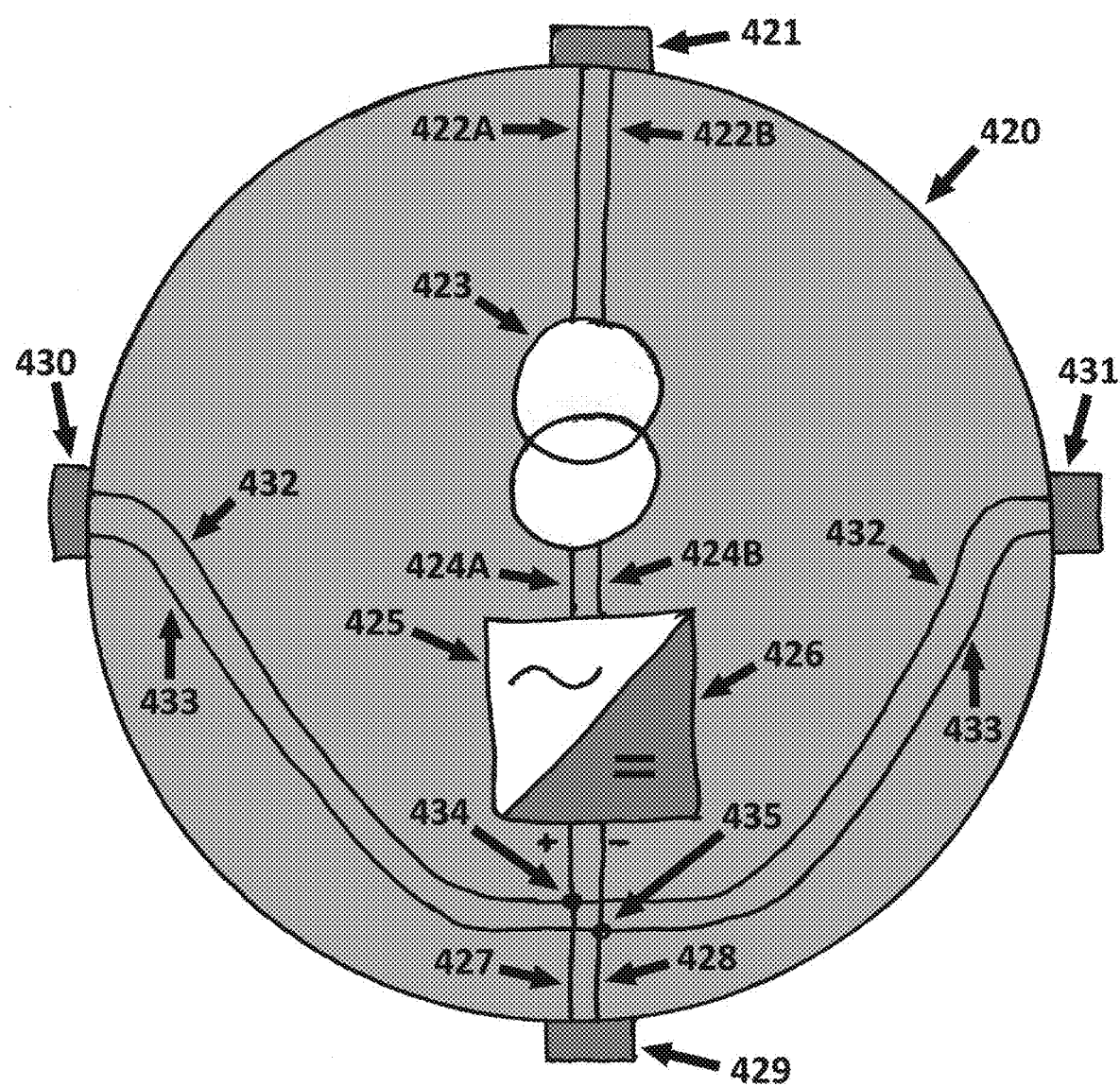
FIG. 17 is a top-down symbolic and/or schematic view of a power converter prefabricated to include one connector through which alternating current is received, another connector through which direct current is output, and two connectors that provide parallel connections to the direct current output.

FIG. 17 is a top-down symbolic and/or schematic view of a power-converter buoy 420 designed and/or fabricated to include one connector 421 through which alternating current is received, e.g. from one or more wave energy converter buoys in an interconnected farm and/or surface grid, and transmitted to wires 422A and 422B. The alternating current electrical power received via connector 421, and connected wires 422A and 422B, is input to a transformer 423 wherein its voltage is changed. The electrical power output by and/or from the transformer 423 is then transmitted through wires 424A and 424B and therethrough input to the receiving end 425 of a rectifier, wherein it is converted from alternating current to direct current (e.g. variable DC). The direct current generated within the rectifier 426 is output to wires 427 and 428, and to the respective contacts within connector 429.

Connectors 430 and 431 provide parallel electrical connections to the output of rectifier 426. The parallel connection wires 432 and 433 are connected (in parallel) to the rectifier output 427 and 428 at respective junctions 434 and 435. Such parallel connectors and connections will facilitate the sharing and/or combining of the rectified electrical power generated by the illustrated power converter, with the direct-current power generated by other wave energy converters, and/or other power converters.

Figure 18:
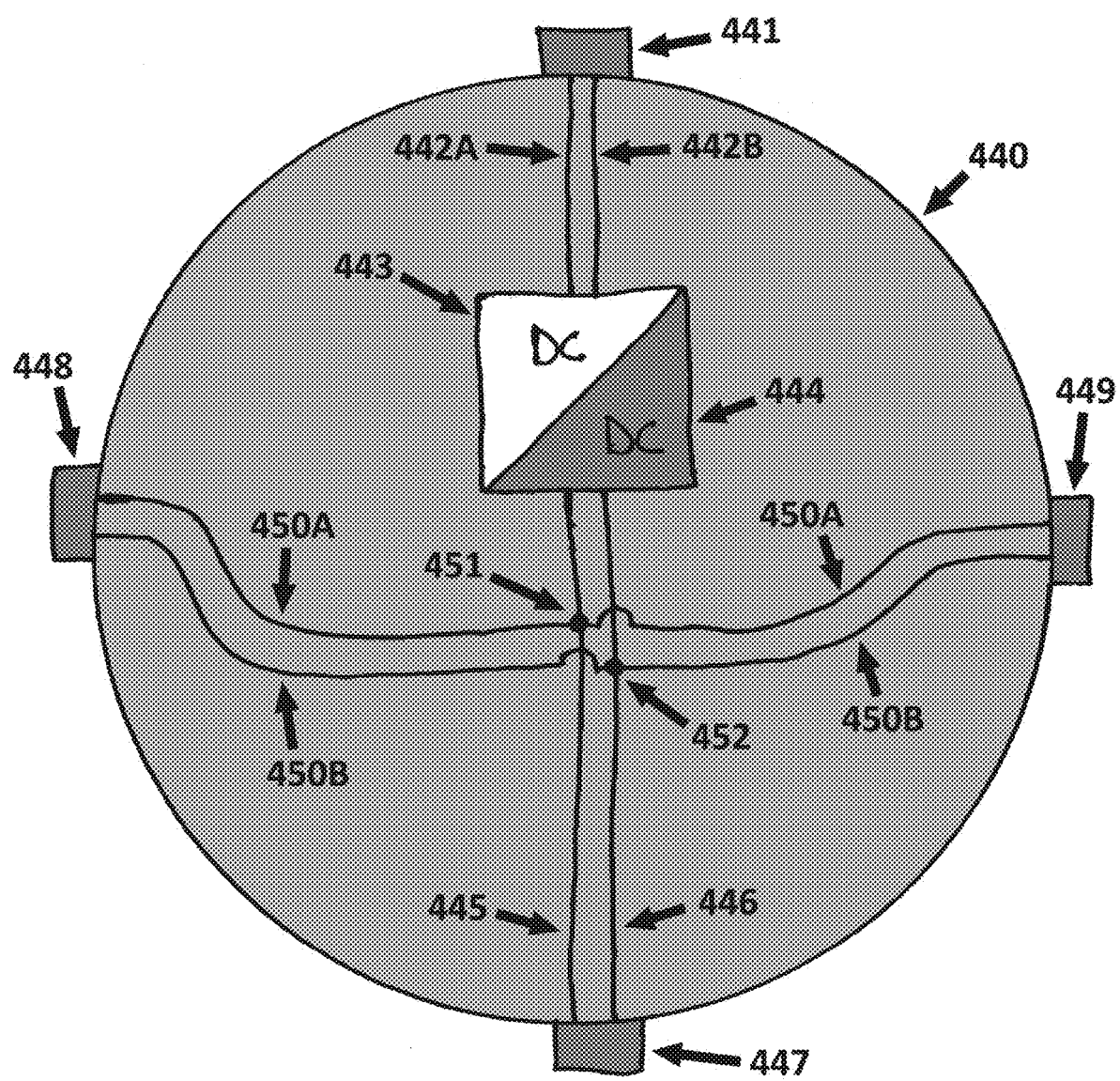
FIG. 18 is a top-down symbolic and/or schematic view of a power converter prefabricated to include one connector through which direct current is received, another connector through which direct current is output, and two connectors that provide parallel connections to the direct current output.

FIG. 18 is a top-down symbolic and/or schematic view of a power converter buoy 440 designed and/or fabricated to include one connector 441 through which direct current (i.e. electrical power of a single voltage polarity), and/or rectified alternating current, is received, e.g. from one or more wave energy converter buoys in an interconnected farm and/or surface grid. The direct and/or rectified current electrical power received via connector 441, and connected wires 442A and 442B, is input to a rectifier 443 wherein its voltage, and/or other characteristics and/or properties of its electrical signal, are changed. The direct current generated and/or modified within the rectifier 443/444 is output to wires 445 and 446, and to the respective contacts within connector 447. Connectors 448 and 449 provide parallel electrical connections to the output of rectifier 444. The parallel connection wires 450A and 450B are connected (in parallel) to the rectifier output 445 and 446 at junctions 451 and 452, respectively. Such parallel connectors and connections will facilitate the sharing and/or combining of the modified direct-current electrical power generated by the illustrated power converter, with the direct-current power generated by other wave energy converters, and/or other power converters.

Figure 19:
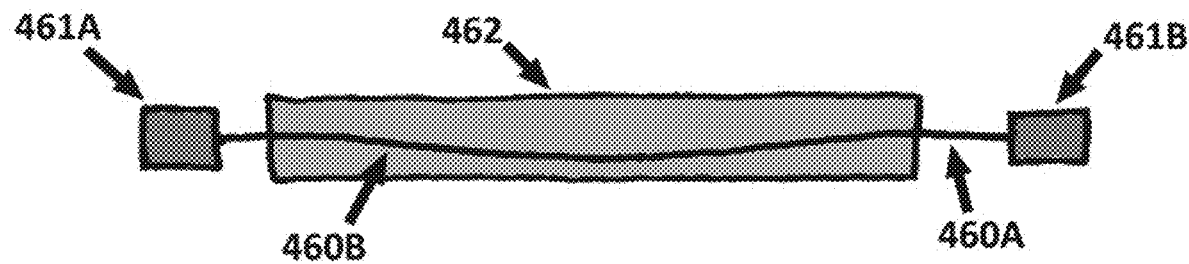
FIG. 19 is an illustration of a modular electrical connecting cable, i.e. a power cable.

FIG. 19 is an illustration of a modular electrical connecting cable, i.e. a power cable, of the present disclosure. A single wire, and/or electrical conductor, is connected, on opposing ends 460A, 460B, by connectors, plugs, outlets, and/or electrical interfaces and/or adapters, 461A and 461B. All, or a portion, of the wire is encased, enclosed, surrounded, and/or covered by, and/or encased within, a protective sheath 462, and/or film, layer, barrier, jacket, and/or tube. The connectors 461A and 461B of the cable are complementary, and/or suitable for interconnection with, corresponding connectors on one or more wave energy converters, and/or power converters, within a surface farm grid of the present disclosure.

In one embodiment, the connectors 461A and 461B are of the same type, design, specification, and/or style, and are each compatible with, and equally compatible with, at least one connector on at least one wave energy converter and/or power converter within a converter farm grid of the present disclosure. In another embodiment, the connectors 461A and 461B are not of the same type, design, specification, and/or style, and they are each compatible with different wave energy converter and/or power converter connectors.

Figure 20:
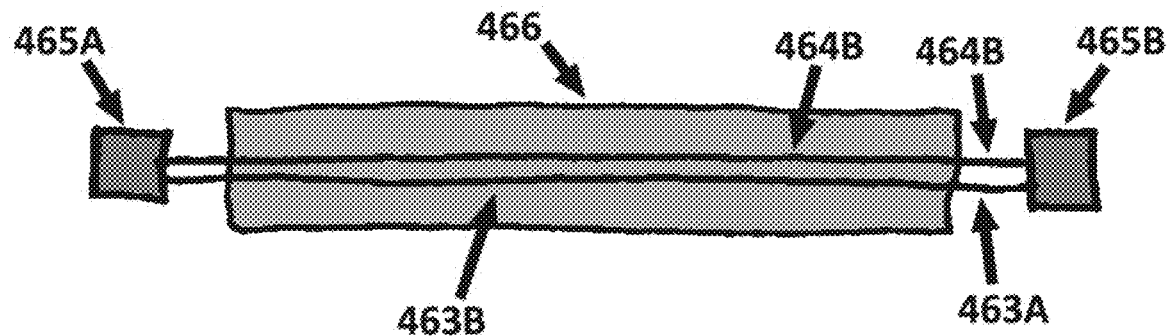
FIG. 20 is an illustration of a modular electrical connecting cable, i.e. a power cable.

FIG. 20 is an illustration of a modular electrical connecting cable, i.e. a power cable, of the present disclosure. Two wires, 463A,B and 464B, and/or electrical conductors, are connected, on opposing ends, by connectors, plugs, outlets, and/or electrical interfaces and/or adapters, 465A and 465B. All, or a portion, of wires 463A,B and 464B are encased, enclosed, surrounded, and/or covered by, and/or encased within, a protective sheath 466, and/or film, layer, barrier, jacket, and/or tube. The connectors 465A, 465B of the cable are complementary, and/or suitable for interconnection with, corresponding connectors on one or more wave energy converters, and/or power converters, within a surface farm grid of the present disclosure. In one embodiment, the wires 463A,B and 464B are of the same gauge and/or electrical power capacity. In another embodiment, they are of different gauges and/or electrical power capacities.

In one embodiment, the connectors 465A and 465B are of the same type, design, specification, and/or style, and are each compatible with, and equally compatible with, at least one connector on at least one wave energy converter and/or power converter within a converter farm grid of the present disclosure. In another embodiment, the connectors 465A and 465B are not of the same type, design, specification, and/or style, and they are each compatible with different wave energy converter and/or power converter connectors.

Figure 21:
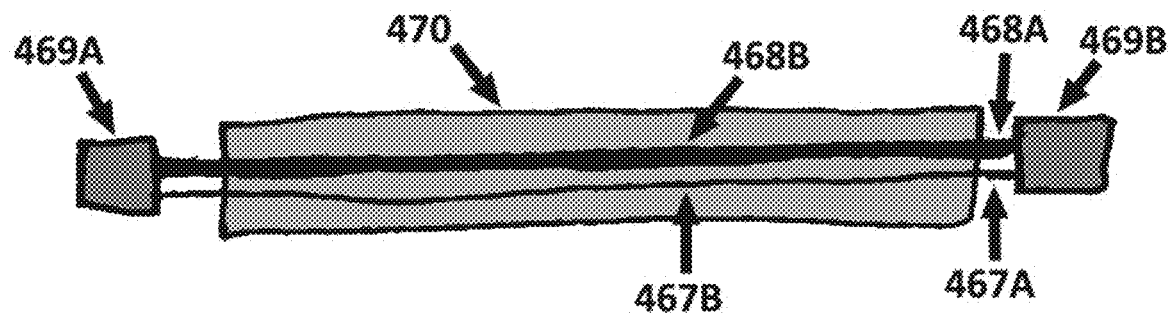
FIG. 21 is an illustration of a modular electrical connecting cable, i.e. a power cable.

FIG. 21 is an illustration of a modular electrical connecting cable, i.e. a power cable, of the present disclosure. Two wires 467A,B and 468A,B, and/or electrical conductors, are connected, on opposing ends, by connectors, plugs, outlets, and/or electrical interfaces and/or adapters, 469A and 469B. All, or a portion, of wires 467A,B and 468A,B are encased, enclosed, surrounded, and/or covered by, and/or encased within, a protective sheath 470, and/or film, layer, barrier, jacket, and/or tube.

The connectors 469A and 469B of the cable are complementary, and/or suitable for interconnection with, corresponding connectors on one or more wave energy converters, and/or power converters, within a surface farm grid of the present disclosure. In the illustrated embodiment, the wires 467A,B and 468A,B are of different gauges and/or electrical power capacities, with wire 468A,B being of a heavier gauge, and being capable of transmitting a greater amount of electrical energy. In one embodiment, the connectors 469A and 469B are of the same type, design, specification, and/or style, and are each compatible with, and equally compatible with, at least one connector on at least one wave energy converter and/or power converter within a converter farm grid of the present disclosure. In another embodiment, the connectors 469A and 469B are not of the same type, design, specification, and/or style, and they are each compatible with different wave energy converter and/or power converter connectors.

Figure 22:
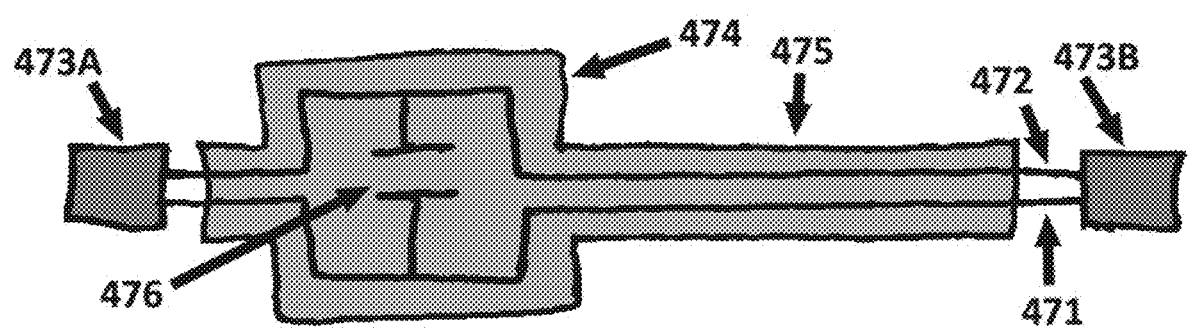
FIG. 22 is an illustration of a modular electrical connecting cable, i.e. a power cable.

FIG. 22 is an illustration of a modular electrical connecting cable, i.e. a power cable, of the present disclosure. Two wires 471 and 472, and/or electrical conductors, are connected, on opposing ends, by connectors, plugs, outlets, and/or electrical interfaces and/or adapters, 473A and 473B. All, or a portion, of wires 471 and 472 are encased, enclosed, surrounded, and/or covered by, and/or encased within, a protective sheath 474/475, and/or film, layer, barrier, jacket, and/or tube. The cable incorporates an electrical component and/or device (e.g. a capacitor 476) which promotes, facilitates, improves, and/or optimizes, the transmission of electrical power and/or signals through one or both electrical conductors 471 and 472. The connectors 473A, 473B of the cable are complementary, and/or suitable for interconnection with, corresponding connectors on one or more wave energy converters, and/or power converters, within a surface farm grid of the present disclosure. In one embodiment, the wires 471 and 472 are of the same gauge and/or electrical power capacity. In another embodiment, the wires 471 and 472 are of different gauges and/or electrical power capacities.

In one embodiment, the connectors 473A and 473B are of the same type, design, specification, and/or style, and are each compatible with, and equally compatible with, at least one connector on at least one wave energy converter and/or power converter within a converter farm grid of the present disclosure. In another embodiment, the connectors 473A and 473B are not of the same type, design, specification, and/or style, and they are each compatible with different wave energy converter and/or power converter connectors.

Figure 23:
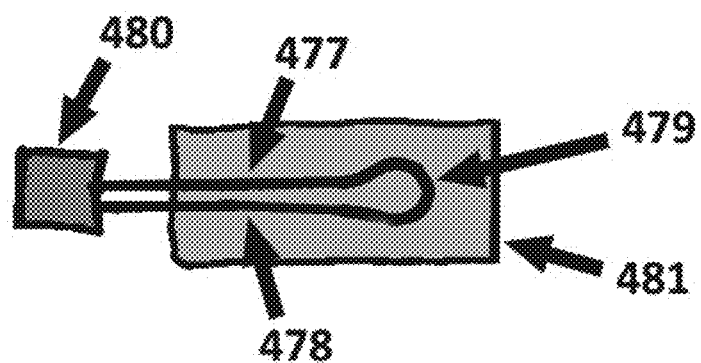
FIG. 23 is an illustration of a modular electrical terminating cable, i.e. a power cable that completes a circuit composed of other converters and cables.

FIG. 23 is an illustration of a modular electrical connecting cable, i.e. a power cable, of the present disclosure. One wire 477-479 and/or electrical conductor, is connected, in a looping fashion, to a single connector, plug, outlet, and/or electrical interface and/or adapter, 480. One end of the wire 477 is connected to a first contact within connector 480. The wire is bent in the middle 479, and returns to the same connector 480, where it is connected to a second contact within that connector. All, or a portion, of wire 477, 478, and 479 is encased, enclosed, surrounded, and/or covered by, and/or encased within, a protective sheath 481, and/or film, layer, barrier, jacket, and/or tube. This type of electrical conductor and/or connector may be used to complete the connection between serially-connected parallel conductors, generators, and/or rectifiers. I.e. this connector and looping conductor can short the terminal ends of parallel circuits in a serial connection.

Figure 24:
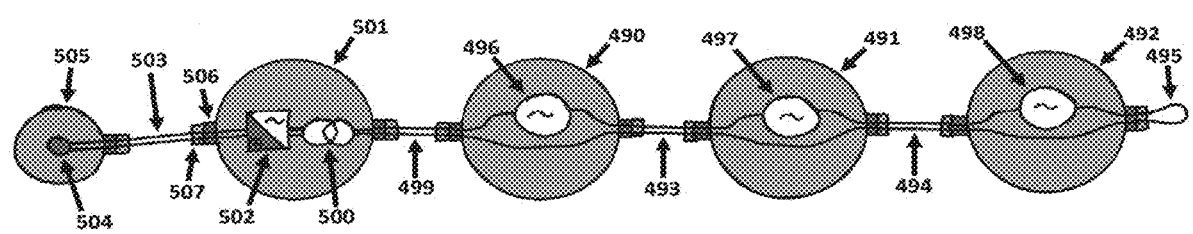
FIG. 24 is a top-down symbolic view of a farm of wave energy converters electrically interconnected in a serial fashion, the alternating current from which is processed by a power converter and connected to a subsea electrical power cable.

FIG. 24 is a top-down symbolic view of a farm of wave energy converters electrically interconnected in a serial fashion, the alternating current (i.e. AC) from which is processed by an AC-to-DC power converter and connected to a subsea electrical power cable. Three wave energy converters 490, 491, and 492 are internally wired in such a way that the connection of modular electrical cables 493, 494, and 495 to appropriate connectors on each converter will result in the serial interconnection of each converter's generator 496-498, respectively. The serial connection of the generators (e.g. asynchronous generators) will cause the voltage of each to be added to the voltage generated by each of the others.

Electrical cable 499 connects the serially connected converter generators, and the alternating current that they produce, to transformer 500 in power converter 501. The alternating current output of that transformer is transmitted by wiring within converter 501 to rectifier 502 wherein it is converted to variable high-voltage direct current. That high-voltage direct current (i.e. HVDC) is transmitted via cable 503 to a subsea HVDC cable connected to cable 503 at 504 within, on, or adjacent to, buoy 505.

Notice that through the use of three appropriately wired wave energy converters (i.e. wired so as to create a circuit amenable to a serialized interconnection of their generators), one power-conditioning and/or converting buoy, and five modular electrical cables, a complete wave energy farm (albeit a small one), and a surface electrical grid therein, may be assembled and/or deployed through the interconnection of only nine pairs of electrical connectors, e.g. the connected pair of connectors 506 and 507.

The illustrated farm and grid incorporates AC converters, e.g. of the type illustrated and discussed in relation to FIG. 12, connected serially, and a power converter, e.g. of the type illustrated and discussed in relation to FIG. 17, that takes AC and converts it into HVDC. An equivalent farm and grid could have been assembled, constructed, and/or fabricated, using DC converters (i.e. converters using rectifiers to transform the AC of their generators into variable DC), e.g. of the type illustrated and discussed in relation to FIG. 14, likewise connected serially, and a power converter, e.g. of the type illustrated and discussed in relation to FIG. 18, that takes DC and converts it into HVDC.

Figure 25:
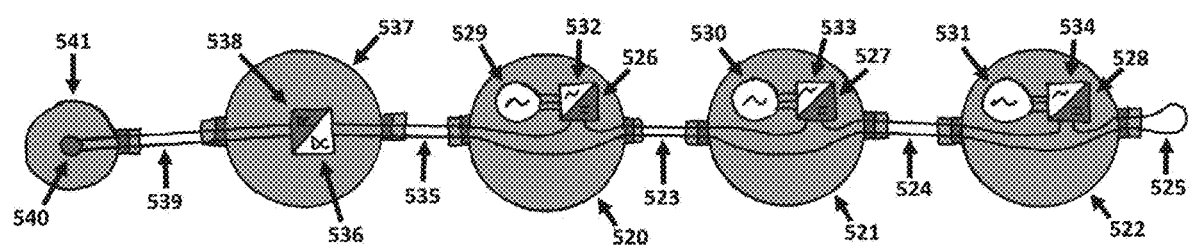
FIG. 25 is a top-down symbolic view of a farm of wave energy converters electrically interconnected in a parallel fashion, the direct current from which is processed by a power converter and connected to a subsea electrical power cable.

FIG. 25 is a top-down symbolic view of a farm of wave energy converters electrically interconnected in a serial fashion, the direct current (DC), i.e. the rectified alternating current (AC), from which is processed by a DC-to-DC power converter and connected to a subsea electrical power cable.

Three wave energy converters 520, 521, and 522 are internally wired in such a way that the connection of modular electrical cables 523, 524, and 525 to appropriate connectors on each converter will result in the serial interconnection of the output 526-528, respectively, of each converter's rectifier, where the three-phase alternating current produced by each converter's respective generator 529-531 is the input to each respective rectifier 532-534. The serial connection of the rectifiers will cause the voltage of each to be added to the voltage generated by each of the others.

Electrical cable 535 connects the serially connected converter rectifiers, and the variable DC that they produce, to first rectifier 536 within power-conditioning buoy 537 wherein it is converted to variable high-voltage direct current. That high-voltage direct current (i.e. HVDC) is transmitted from second rectifier 538 via cable 539 to a subsea HVDC cable connected to it at 540 in, on, or adjacent to, buoy 541.

Notice that through the use of three appropriately wired wave energy converters (i.e. wired so as to create a circuit amenable to a serial interconnection of their rectifiers), one power-conditioning and/or converting buoy, one mooring buoy, and five modular electrical cables, a complete wave energy farm (albeit a small one), and a surface electrical grid therein, may be assembled and/or deployed through the interconnection of only nine pairs of electrical connectors.

The illustrated farm and grid incorporates converters, e.g. of the type illustrated and discussed in relation to FIG. 14, that generate and/or output variable DC (and/or rectified AC), connected serially, and a power converter, e.g. of the type illustrated and discussed in relation to FIG. 18, that takes DC and converts it into HVDC. An equivalent farm and grid could have been assembled, constructed, and/or fabricated, using AC converters (i.e. converters using generators to output AC), e.g. of the type illustrated and discussed in relation to FIG. 12, likewise connected serially, and a power converter, e.g. of the type illustrated and discussed in relation to FIG. 17, that takes AC and converts it into HVDC.

Figure 26:
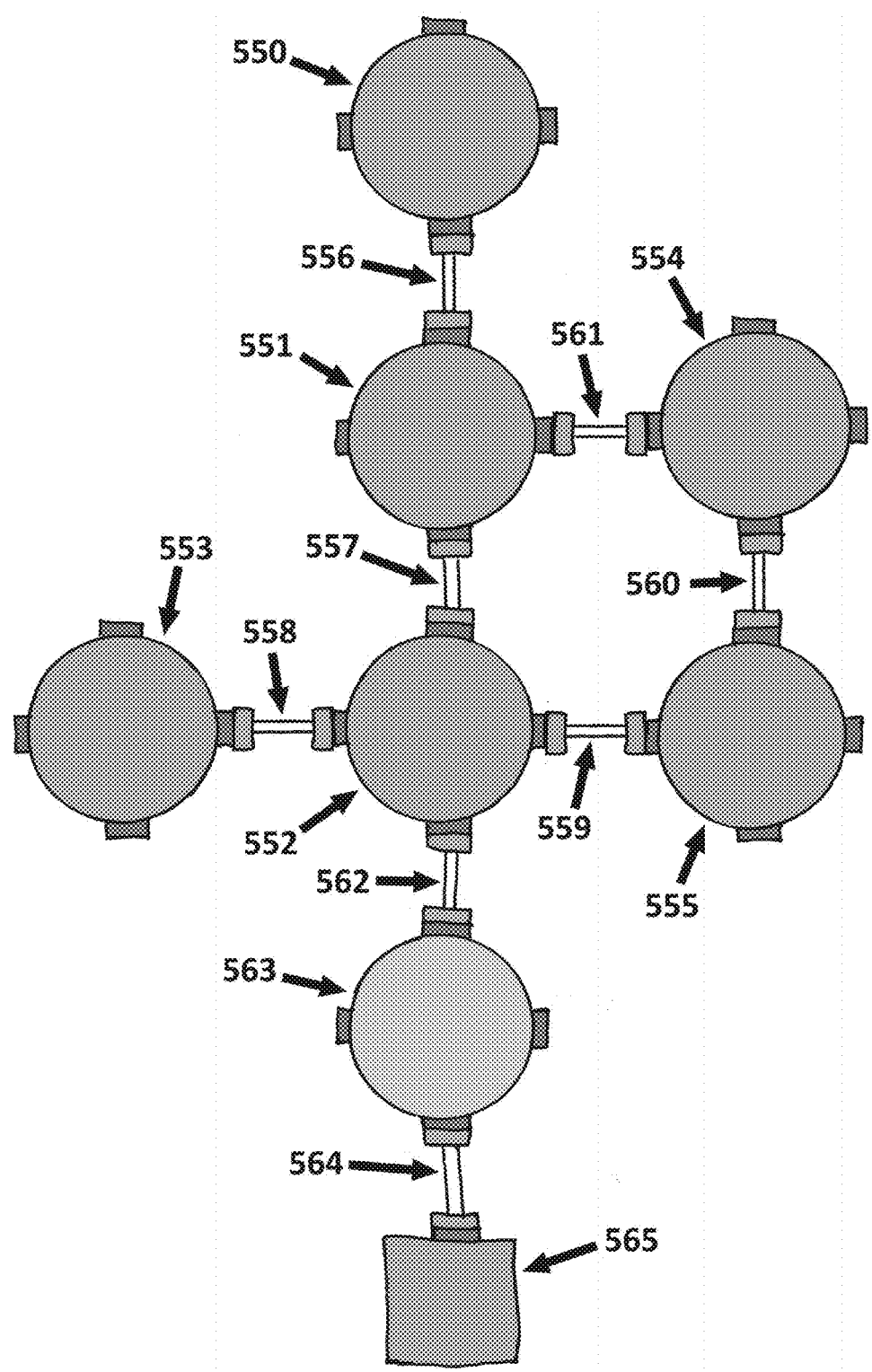
FIG. 26 is a top-down symbolic view of a farm of wave energy converters electrically interconnected in a parallel fashion, the electrical current from which is processed by a power converter and connected to a platform on which at least a portion of the power is consumed.

FIG. 26 is a top-down symbolic view of a farm of wave energy converters electrically interconnected in a parallel fashion. Wave energy converters 550-555 are interconnected by modular electrical cables 556-561. The power generated by the converters is combined, in parallel fashion, and transmitted, via modular electrical cable 562 to power conditioning and/or converting buoy 563. The resulting "conditioned" electrical power is then transmitted, via cable 564, to a platform 565 whereon and/or wherein it will be consumed and/or converted, at least in part, e.g. into a chemical fuel.

In one embodiment, the illustrated farm and grid incorporates converters, e.g. of the type illustrated and discussed in relation to FIG. 13, that generate and/or output, via parallel circuits, AC, and a power converter, e.g. of the type illustrated and discussed in relation to FIG. 17, that takes AC and converts it into HVDC. In another embodiment, the illustrated farm and grid incorporates converters, e.g. of the type illustrated and discussed in relation to FIG. 15, that generate and/or output, via parallel circuits, DC, and a power converter, e.g. of the type illustrated and discussed in relation to FIG. 18, that takes DC and converts it into HVDC. In another embodiment, 563 is another wave energy converter, and the "unconditioned" and/or "unconverted" output of the seven converter farm is transmitted to platform and/or buoy 565.

In another embodiment, the illustrated farm and grid converts the generated power into high-voltage alternating current (HVAC) which is then transmitted to platform 565.

Figure 27:
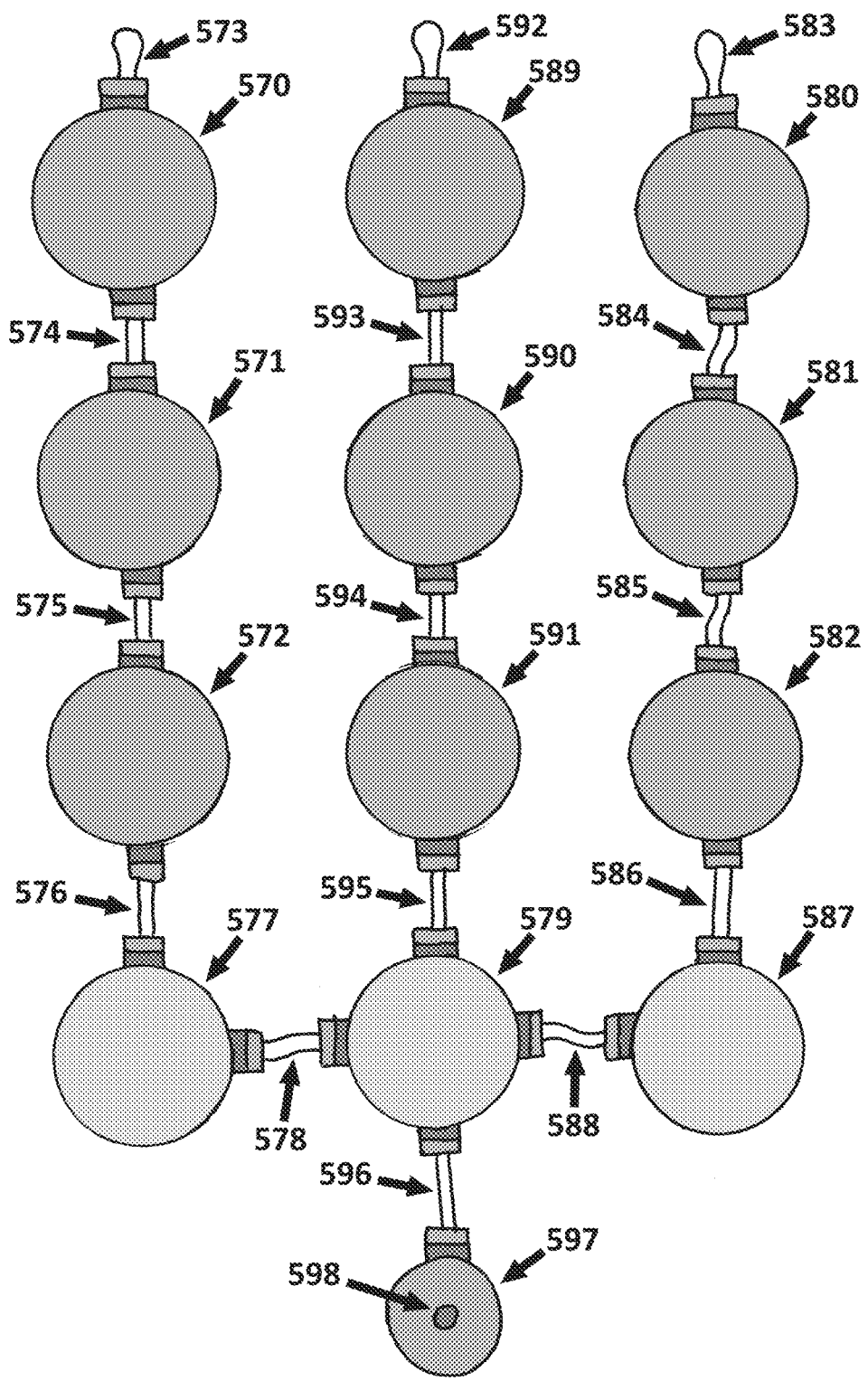
FIG. 27 is a top-down symbolic view of a farm of wave energy converters electrically interconnected in a hybrid fashion, in which three sets of converters are connected in serial fashion, and the electrical current from each series is processed by a power converter and the output of each power converter is then combined in a parallel fashion and connected to a subsea electrical power cable.

FIG. 27 is a top-down symbolic view of a farm of energy converters electrically interconnected in a "hybrid" fashion, i.e. a farm comprising both serial and parallel electrical connections. Many other varieties of "hybrid" topology will be obvious to one skilled in the art and are all supported by and disclosed by this disclosure. Wave energy converters 570, 571, and 572 are electrically connected in a serial fashion, with modular electrical cables 573-575. Their serially combined generated electrical power is transmitted, via modular electrical cable 576, to power conditioning buoy 577, and the conditioned power is transmitted, in parallel fashion, and/or by parallel circuit, 578, to power converter 579. Likewise, converters 580, 581, and 582 are electrically connected in a serial fashion, with modular electrical cables 583-585. Their serially combined generated electrical power is transmitted, via modular electrical cable 586, to power conditioning buoy 587, and the conditioned power is transmitted, in parallel fashion, and/or by parallel circuit, 588, to power converter 579.

Similarly, converters 589, 590, and 591 are electrically connected in a serial fashion, with modular electrical cables 592, 593, and 594. Their serially combined generated electrical power is transmitted, via modular electrical cable 595, to power conditioning buoy 579, wherein it is conditioned and/or converted. And, that conditioned output power is then combined, in parallel fashion, with the conditioned power generated by power converters 577 and 587. The combined conditioned power from the entire farm is then transmitted, via modular electrical cable 596, to buoy 597 where it is transmitted to a cable 598 that is electrically connected to, and/or is an extension of, a subsea power cable.

In one embodiment, the illustrated farm and grid incorporates converters, e.g. of the type illustrated and discussed in relation to FIG. 13, that generate and/or output, via parallel circuits, AC, and a power converter, e.g. of the type illustrated and discussed in relation to FIG. 17, that takes AC and converts it into HVDC.

In another embodiment, the illustrated farm and grid incorporates converters, e.g. of the type illustrated and discussed in relation to FIG. 15, that generate and/or output, via parallel circuits, DC, and a power converter, e.g. of the type illustrated and discussed in relation to FIG. 18, that takes DC and converts it into HVDC.

Figure 28:
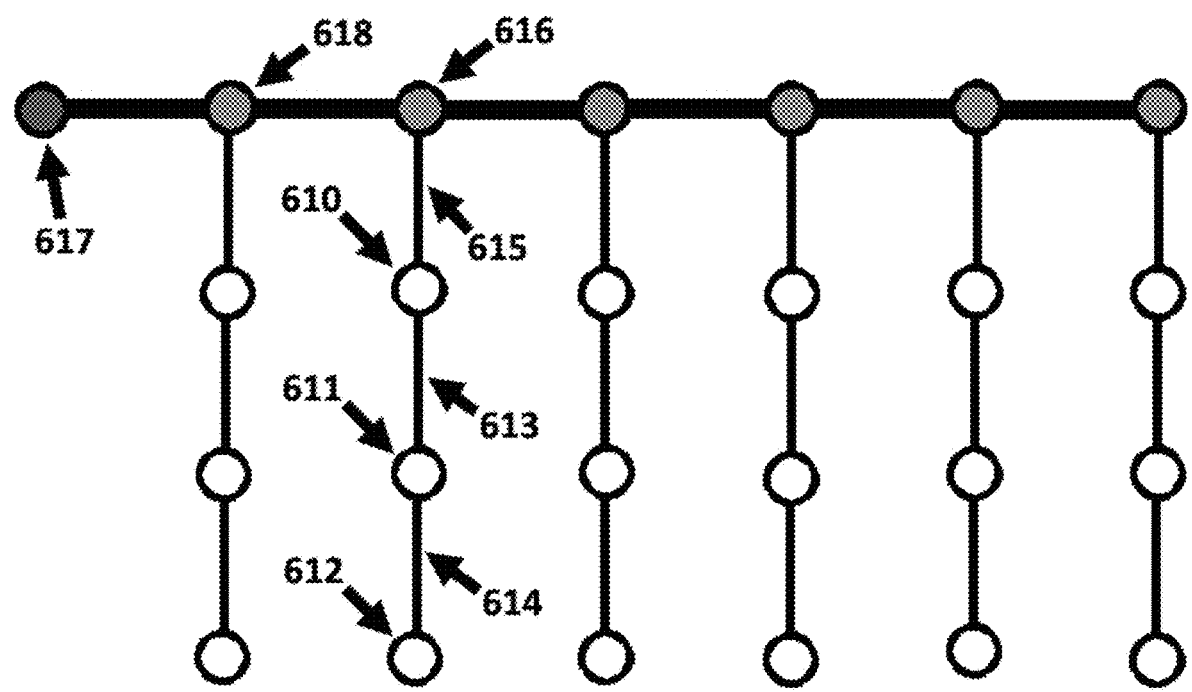
FIG. 28 is a top-down symbolic view of a farm of wave energy converters electrically interconnected in a hybrid fashion, in which six sets of converters are connected in serial fashion, and the electrical current from each series is processed by a power converter and the output of each power converter is then combined in a parallel fashion and connected to a subsea electrical power cable.

FIG. 28 is a top-down symbolic view of a farm of wave energy converters electrically interconnected in a "hybrid" fashion, i.e. a farm comprising both serial and parallel electrical connections.

Six sets of three wave energy converters each, e.g. converters 610-612, are electrically connected in a serial fashion, with modular electrical cables, e.g. 613 and 614. The serially combined electrical power generated by each set of converters is transmitted, e.g. via modular electrical cable 615, to a set-specific power conditioning buoy, e.g. 616, and the conditioned power is combined with that of the conditioned power derived from the other sets, e.g., with the conditioned power generated by set-specific power conditioning buoy 618. The sum of the conditioned power derived from each of the six sets of wave energy converters is then transmitted to power conditioning buoy 617, the output of which is electrically connected and transmitted to a subsea power cable (not shown, and connected to the surface grid within, at, on, or adjacent to, power conditioning buoy 617).

In one embodiment, the illustrated farm and grid incorporates converters, e.g. 610-612 of the type illustrated and discussed in relation to FIG. 12, that generate and/or output, via serial circuits, AC, and a set-specific power converter, e.g. of the type illustrated and discussed in relation to FIG. 17, that takes AC and converts it into HVDC. The DC generated by each set-specific power converter is connected in parallel fashion, with the accumulated DC being transmitted to a power converter of the type illustrated and discussed in relation to FIG. 18 that converts DC into HVDC after which it is transmitted to a subsea power cable (not shown).

In one embodiment, the illustrated farm and grid incorporates converters, e.g. 610-612 of the type illustrated and discussed in relation to FIG. 12, that generate and/or output, via serial circuits, AC, and a set-specific power converter, e.g. of the type illustrated and discussed in relation to FIG. 17, that takes AC and converts it into HVDC. The DC generated by each set-specific power converter is connected in parallel fashion, with the accumulated DC being transmitted to a power converter of the type illustrated and discussed in relation to FIG. 18 that converts DC into HVDC after which it is transmitted to a subsea power cable (not shown).

In one embodiment, the illustrated farm and grid incorporates converters, e.g. 610-612 of the type illustrated and discussed in relation to FIG. 13, that generate and/or output, via parallel circuits, AC, and a set-specific power converter, e.g. of the type illustrated and discussed in relation to FIG. 17, that takes AC and converts it into HVDC. The DC generated by each set-specific power converter is connected in parallel fashion, with the accumulated DC being transmitted to power conditioning buoy 617 and therethrough to a subsea power cable (not shown).

In one embodiment, the illustrated farm and grid incorporates converters, e.g. 610-612 of the type illustrated and discussed in relation to FIG. 14, that generate and/or output, via serial circuits, DC, and a set-specific power converter of the type illustrated and discussed in relation to FIG. 18, that takes DC and converts it into HVDC. The DC generated by each set-specific power converter is connected in parallel fashion, with the accumulated DC being transmitted to a power converter 644 of the type illustrated and discussed in relation to FIG. 18 that converts DC into HVDC after which it is transmitted to a subsea power cable (not shown).

In one embodiment, the illustrated farm and grid incorporates converters, e.g. 610-612 of the type illustrated and discussed in relation to FIG. 15, that generate and/or output, via parallel circuits, DC, and a set-specific power converter of the type illustrated and discussed in relation to FIG. 18, that takes DC and converts it into HVDC. The DC generated by each set-specific power converter is connected in parallel fashion, with the accumulated DC being transmitted to power conditioning buoy 617 and therethrough to a subsea power cable (not shown).

A farm may be comprised of converters that are connected in parallel or serial. They may generate AC or DC with a parallel or serial circuit. The output of a set of converters producing AC within a farm can then be converted and/or conditioned to produce either a "summed AC or DC" output. Likewise, the output of a set of converters producing DC within a farm can then be converted and/or conditioned to produce either a "summed AC or DC" output. And, the summed AC or DC output from a conditioned set of converters can then be further converted and/or conditioned to formulate a larger summed AC or DC. The scope of the present disclosure includes farms comprised of converters generating and/or putting out any voltage, current, and/or waveform or type. The scope of the present disclosure includes farms comprised of conditioned summations of the outputs of converters so as to produce conditioned outputs of any voltage, current, and/or waveform or type. The scope of the present disclosure includes farms comprised of any mixture, or combination, of converter output types, conditioned output types, and final farm-wide output types (e.g., the type of electrical signal transmitted through a connected subsea power cable).

In another embodiment, the illustrated farm and grid incorporates converters of two different types. Some generate and/or output, in a serial fashion, AC, e.g. of the type illustrated and discussed in relation to FIG. 12, and are connected to power conditioning buoys that transform the AC into DC. Others generate and/or output, in a serial fashion, DC, e.g. of the type illustrated and discussed in relation to FIG. 14, and are connected to power conditioning buoys that transform the DC into DC that is compatible with the DC generated with respect to the AC wave energy converters.

Figure 29:
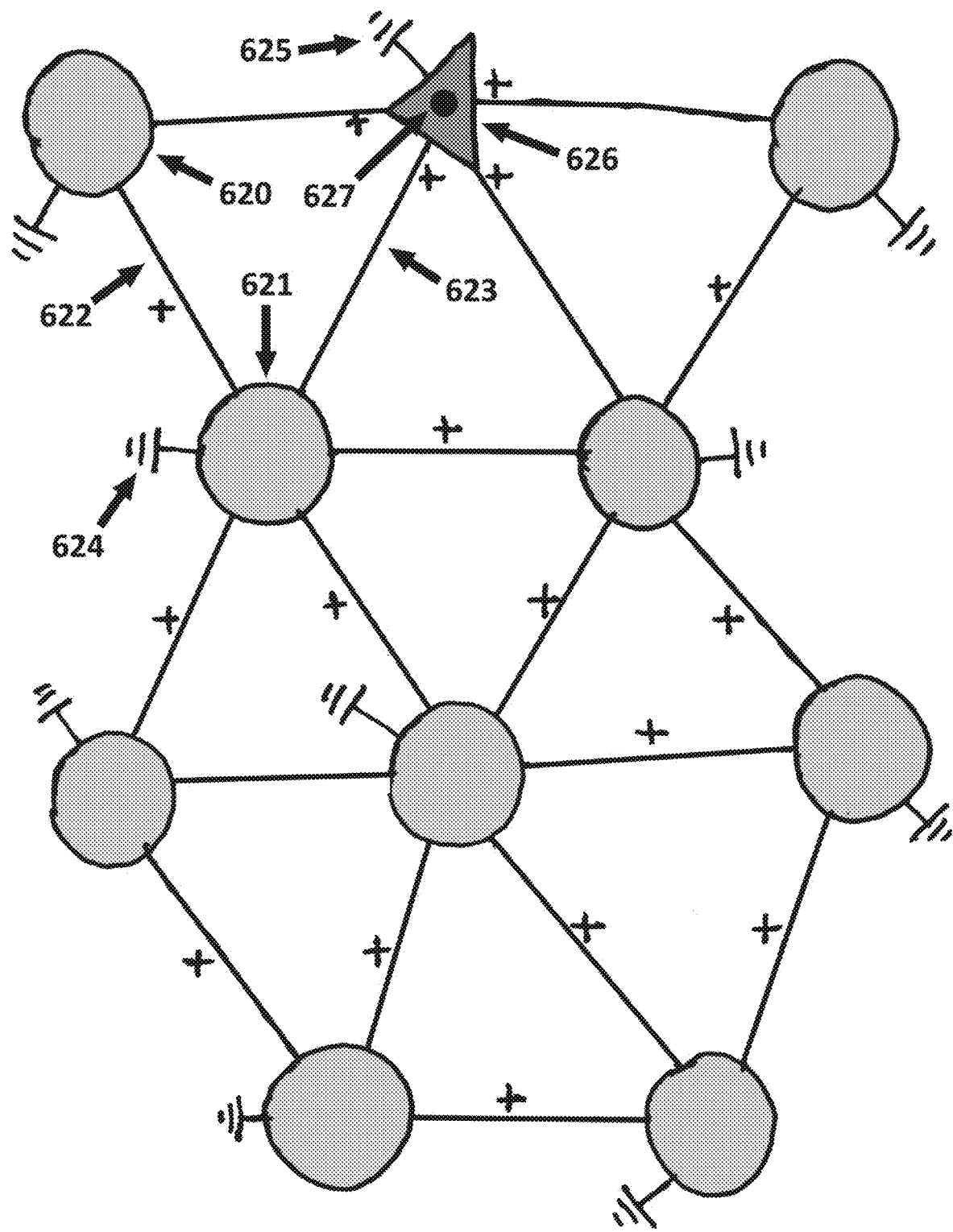
FIG. 29 is a schematic view of a farm of wave energy converters interconnected by electrical cables and using sea water as a common ground.

FIG. 29 is a schematic view of an embodiment of the current disclosure. A farm of wave energy converters, e.g. 620 and 621, are interconnected by electrical cables, e.g. 622 and 623, and all of the converters in the farm, as well as the farm's electrical grid, are using sea water as a common ground, e.g. 624 and 625. Power is transmitted and/or shared within the farm's electrical grid via electrical cables, e.g. 623. And, the electrical power transmitted by each wave energy converter into, and/or shared within, the grid is transmitted through the grid to a buoy 626 and/or converter to which a subsea electrical cable, e.g. 627, is electrically connected (e.g. by a vertical electrical cable).

In this embodiment, the subsea electrical cable, like the farm's grid, transmits current, voltage, and/or electrical power, through a mono-pole, e.g. single wire, electrical cable. The power transmitted through the mono-pole subsea power cable is balanced, and/or completed, by the seawater, which acts as, and/or serves the role of, an amorphous "ground" and/or conductor.

Figure 30:
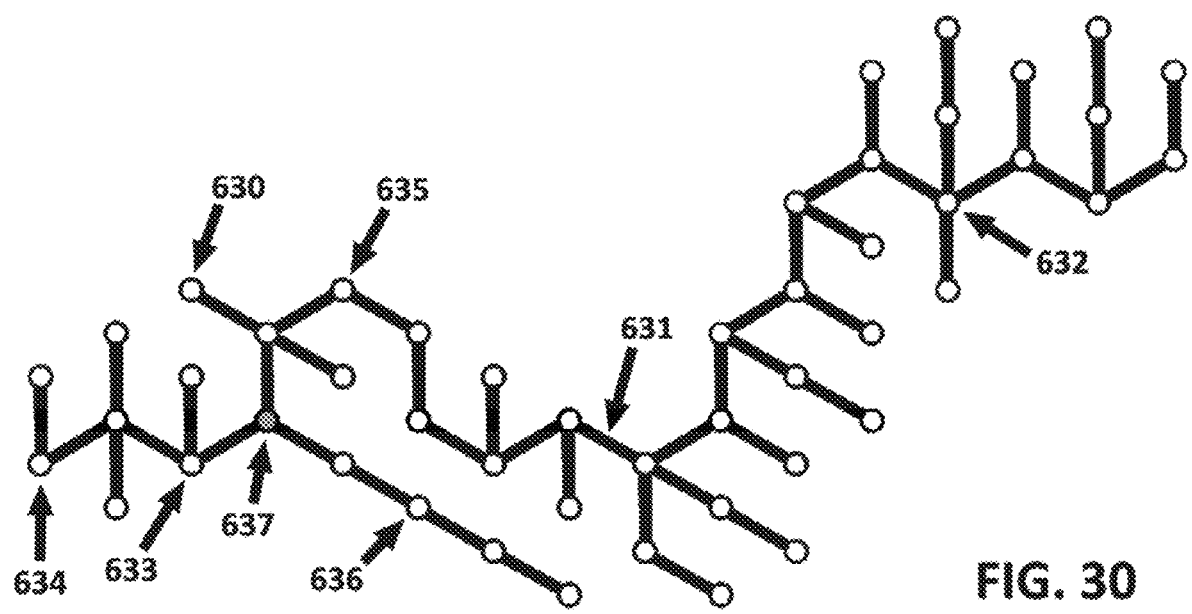
FIG. 30 is a top-down view of an elongate farm of floating devices interconnected with electrical cables.

FIG. 30 is a top-down view of an embodiment of the current disclosure. An elongate farm is composed of a plurality of floating devices, e.g. 630, which are interconnected with electrical cables, e.g. 631. In this embodiment, the farm's electrical grid is composed, and/or comprised, of electrical cables of the same or similar type, gauge, and/or capacity. Each converter in the farm is similar to the one illustrated in FIG. 10, and has been fabricated with, and/or includes and/or incorporates, six externally accessible electrical connectors, for example (but not necessarily) equally spaced around the periphery of each device. Thus, the external, modular, electrical cables used to construct the farm illustrated in FIG. 30 are arranged in a pattern consistent with the native, relatively hexagonal, orientations of the connectors on each converter.

Some of the converters, e.g. 632, in the illustrated farm are directly electrically connected to four other converters. Some, e.g. 633, are directly electrically connected to three other converters. Some, e.g. 634, 635, and 636, are directly electrically connected to two other converters. And, some, e.g. 630, are directly electrically connected to only one other converter. While not shown, some converters could have been directly electrically connected to five or six other converters. In this figure and throughout this disclosure, it is to be understood that schematics like this one show electrical connections, not necessarily mooring connections. Adjacent devices that are not directly electrically connected may nonetheless be connected by a mooring cable, chain, or tether. E.g. devices 630 and 635 may be directly connected by a mooring chain, even though they are not directly connected by an electrical connection. The shown electrical connections e.g. 631 can be integrated with mooring cables.

In this embodiment, the converters are electrically connected to a relatively small number of other converters. In other words, the number of external electrical cables is approximately, if not completely, minimized.

This means, for instance, that there are no "loops" in the farm's electrical grid, i.e. there is only a single path through the external electrical cables within the farm that electrically connects any two converters within the farm. Or, in other words, there are no redundant and/or duplicate paths through and/or by which any two converters within the farm are electrically connected.

This minimization of the complexity and/or redundancy of the electrical cables within the farm's grid also minimizes the time and cost required to deploy a farm. However, while more costly, a greater redundancy in electrical cables and/or connections within a farm can allow electrical power to continue to reach most, if not all, parts of a farm, or to reach a single connection with a subsea power cable from most, if not all, parts of a farm, even when one or more electrical cables, and/or converters, are damaged and/or fail.

In the illustrated farm, one converter 637 is electrically connected (e.g. through a descending electrical cable) to a subsea power cable located adjacent to the seafloor. In a similar embodiment, one buoyant platform is a consumer of the farm's electrical power (e.g., to synthesize chemical fuels), and there is no subsea power cable. In another embodiment, each converter in the farm is similar to the one illustrated in FIG. 11.

Figure 31:
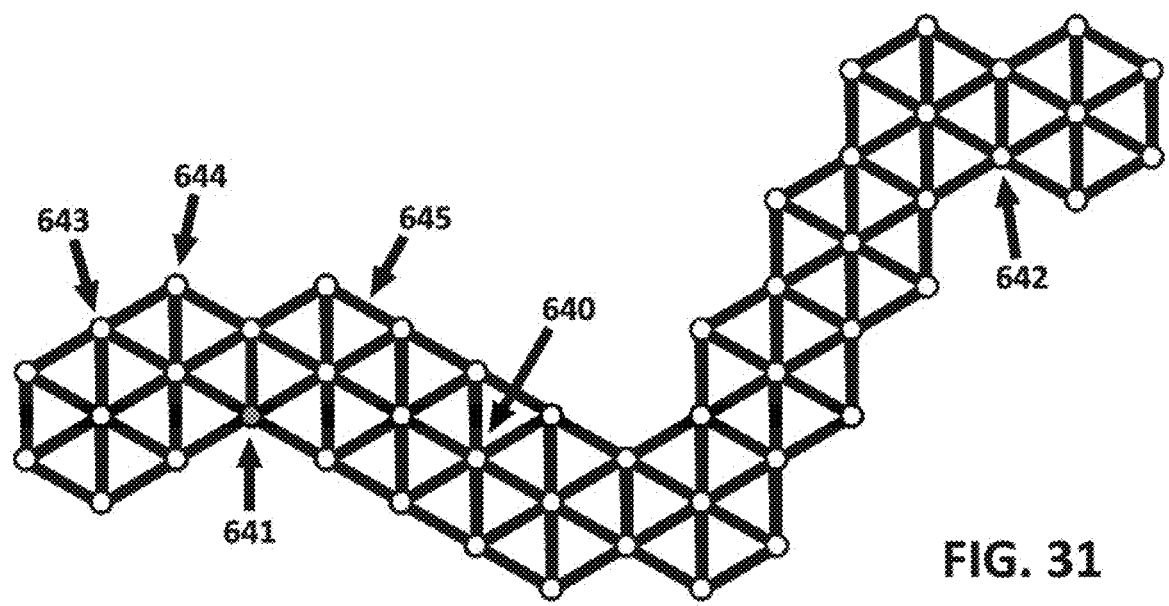
FIG. 31 is a top-down view of an elongate farm of floating devices interconnected with electrical cables.

FIG. 31 is a top-down view of an embodiment of the current disclosure similar to the farm illustrated in FIG. 30. However, in this elongate farm of wave energy converters, the converters are directly electrically interconnected to as many other converters as possible. For example, many converters, e.g., 640, in this farm are directly electrically connected to six other converters. Some, e.g., 641 and 642, are directly electrically connected to five other converters. Some, e.g., 643, are directly electrically connected to four other converters. Some, e.g., 644, are directly electrically connected to three other converters. And, none of the converters are directly electrically connected to fewer than three other converters.

In the illustrated embodiment, the electrical power transmitted into, and/or added to, the farm's grid is thereafter and/or thereby transmitted to a subsea power cable (not shown) by a connection made at and/or through converter 641. The greater redundancy of the electrical cables, e.g. 645, and/or connections within this farm's grid (as opposed to those in the grid of FIG. 30) mean that local faults and/or failures in the grid are less likely to completely isolate any large portion of the farm, and/or the converters therein. However, the cost of the additional and/or redundant external electrical cables is greater.

Figure 32:
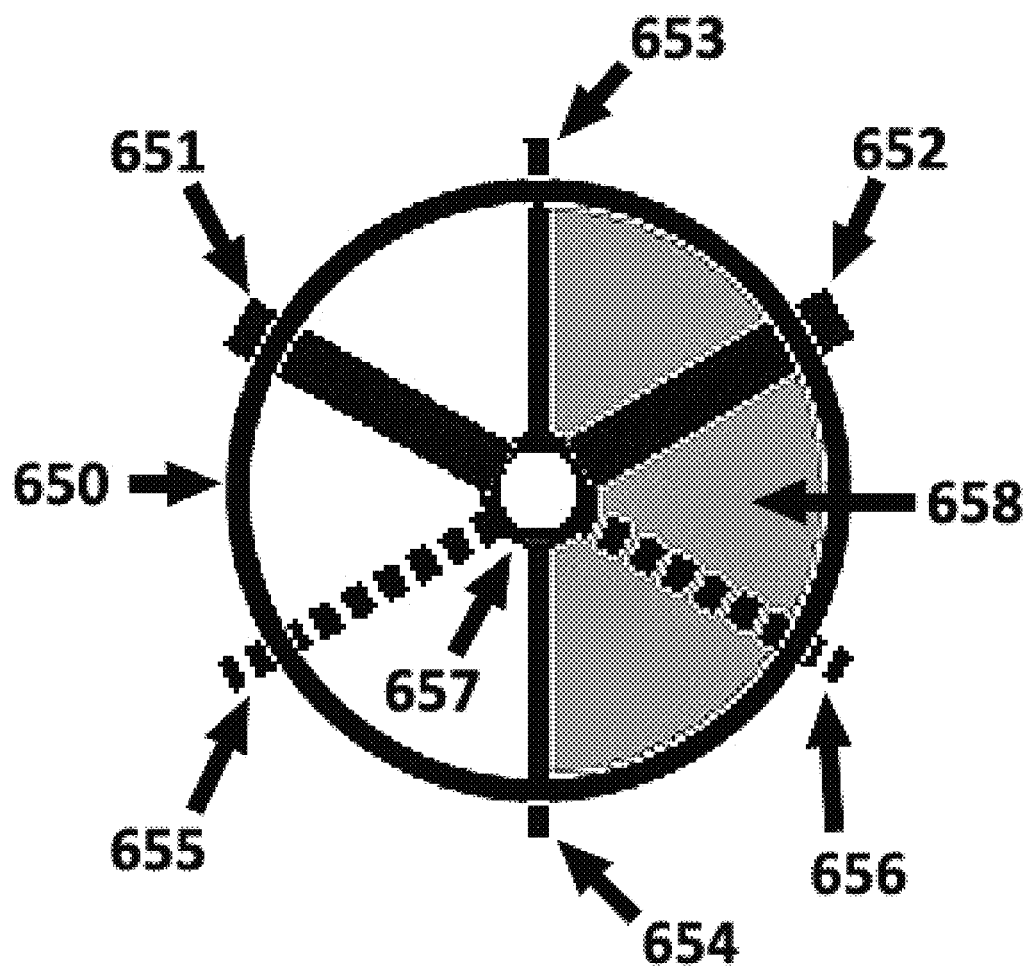
FIG. 32 is a top-down symbolic and/or schematic view of a wave energy converter prefabricated to include two connectors and intermediary cables each of three different gauges.

FIG. 32 is a top-down symbolic and/or schematic view of an embodiment of the current disclosure. A wave energy converter 650 has been prefabricated so as to include six externally accessible electrical connectors 651-656, providing connection points and/or interfaces that can electrically connect and/or join one or more external electrical cables, and/or their respective connectors, to the converter's internal wiring and/or grid. The internal wiring within wave energy converter 650 that is connected to, and/or that electrically connects, the converter's two externally accessible electrical connectors 651 and 652 are capable of transmitting relatively powerful electrical currents, voltages and/or signals.

The internal wiring within wave energy converter 650 that is connected to, and/or that electrically connects, the converter's two externally accessible electrical connectors 653 and 654 are capable of transmitting relatively moderate electrical currents, voltages and/or signals, but not currents, voltages and/or signals as powerful as those that the wiring connecting connectors 651 and 652 can transmit. And, the internal wiring within wave energy converter 650 that is connected to, and/or that electrically connects, the converter's two externally accessible electrical connectors 655 and 656 are capable of transmitting no more than relatively weak electrical currents, voltages and/or signals. All of the internal wiring connected to converter 650's externally accessible electrical connectors is electrically interconnected, and a current, voltage and/or signal present on any one of those electrical connectors will be transmitted to, and/or manifested at, each of the other electrical connectors.

A generator 657 within the wave energy converter 650 is electrically connected to the wiring that interconnects all six of the converter's externally accessible electrical connectors, and will be transmitted to each and every external electrical cable connected to any of those externally accessible electrical connectors. The symbolic representation 650 of this wave energy converter includes left and right halves distinguished by differential shading (i.e., right half 658 is darker than the left half). This is intended to make the orientation of these converter's more easily discernable within the sample farm embodiment illustrated in FIG. 33.

Figure 33:
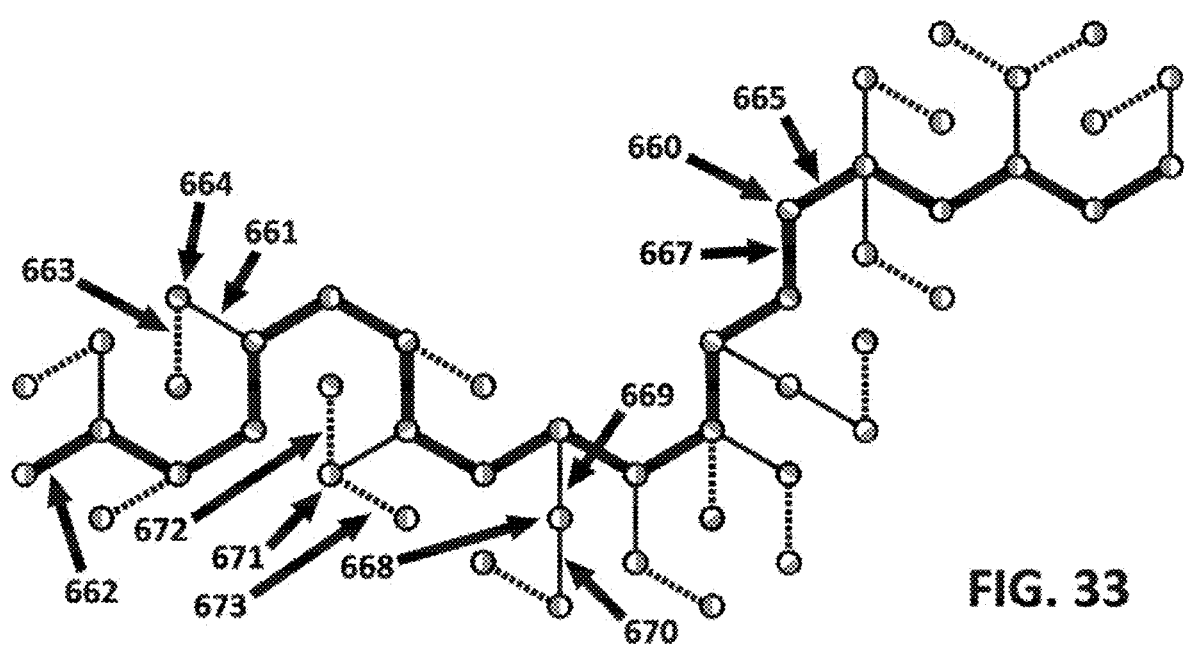
FIG. 33 is a top-down view of an elongate farm of floating devices interconnected with wave energy converters with the types and orientations of electrical connections illustrated in FIG. 32, and with corresponding interconnecting electrical cables of those differing gauges.

FIG. 33 is a top-down view of an embodiment of the current disclosure. An elongate farm of floating wave energy converters, e.g. 660, of the type, design, and/or characteristics of the converter illustrated in FIG. 32, are electrically interconnected with electrical cables, e.g. 661, so as to form an electrical grid within the farm, wherein the electrical grid floats, and/or is otherwise positioned (e.g., through their attachment and/or connection to elastic mooring cables connecting the respective converters), adjacent to an upper surface of the body of water on which the converters float.

This farm-level electrical grid contains, and/or is comprised of, electrical cables of at least three different gauges and/or electrical capacities. Some cables, e.g. 662, (represented by relatively heavy solid lines) are of relatively heavy gauge, and are therefore capable of transmitting relatively powerful currents, voltages and/or signals. Some, e.g. 661, (represented by relatively light solid lines) are of relatively lighter gauge, and are therefore capable of transmitting relatively less powerful currents, voltages and/or signals. And, some, e.g. 663, (represented by dashed lines) are of the lightest gauge, and are therefore capable of transmitting only relatively small and/or weak currents, voltages and/or signals.

The electrical cables of differing gauges are interconnected by means of their connections to externally accessible electrical sockets and/or connectors of correspondingly differing gauges on the constituent wave energy converters. The representations of the wave energy converters, e.g. 664, are half shaded so as to correspond to the converter, and its layout of external electrical connectors, illustrated in FIG. 32.

Note that wave energy converters of a single type, design, and/or structure, comprising cable sockets and/or connectors each of which is designed to interface with, and/or connect to, a cable with one of three different standard gauges, wherein those gauge-specific cable sockets are arranged in a stereotypical and standardized pattern about the periphery of the converter, when interconnected through their combination with standardized, commoditized, and/or modular, electrical cables of those same three different gauges, permits the design, fabrication, and efficient operation of a relatively complicated farm electrical grid.

Through the combination of electrical cables of differing gauges, an electrical grid may be created that conserves the materials and/or resources of which the cables are made, as well as minimizing the time and cost of implementing such a grid. Relatively heavy-gauge electrical cables provide a "backbone" for the grid through which large amounts of current, voltage, and/or electrical power, may be transmitted. Relatively moderate-gauge electrical cables provide electrical connections to subsets of converters from and/or through which relatively more modest amounts of current, voltage, and/or electrical power may flow into the grid's backbone. And, relatively light-gauge electrical cables provide electrical connections to individual converters and electrically connect them to the grid without the waste of using relatively heavier cables to implement such connections that will not need the additional electrical bandwidth, and/or capacity, that the relatively heavier cables would provide.

Converter 660 is connected to two relatively heavy electrical cables 665 and 667 through that portion of its internal wiring that connects the externally accessible electrical connectors 651 and 652 in FIG. 32. Note that cable 665 will be required to transmit the electrical power generated by all of the converters in the farm in that part and/or portion of the grid to the right of converter 660, which includes fourteen converters.

Converter 668 is connected to two electrical cables 669 and 670 of relatively modest capacity. These relatively modest capacity electrical cables are inter-connected through that portion of the converter's internal wiring that connects the externally accessible electrical connectors 653 and 654 in FIG. 32. Note that cable 670 will be required to transmit the electrical power generated by two converters into the grid (i.e., into the backbone cable 667). While, cable 669 will be required to transmit the electrical power generated by three converters, i.e. including converter 668, into the grid (i.e., into the backbone cable 667).

Converter 671 is connected to three electrical cables, two 672 and 673 of which are of the relatively lowest capacity (e.g. enough capacity to transmit only the electrical power generated by a single converter). These relatively low capacity electrical cables are inter-connected through that portion of the converter's internal wiring that connects the externally accessible electrical connectors 655 and 656 in FIG. 32. Note that cables 672 and 673 are, at most, only required to transmit the electrical power generated by a single converter each into the grid.

Figure 34:
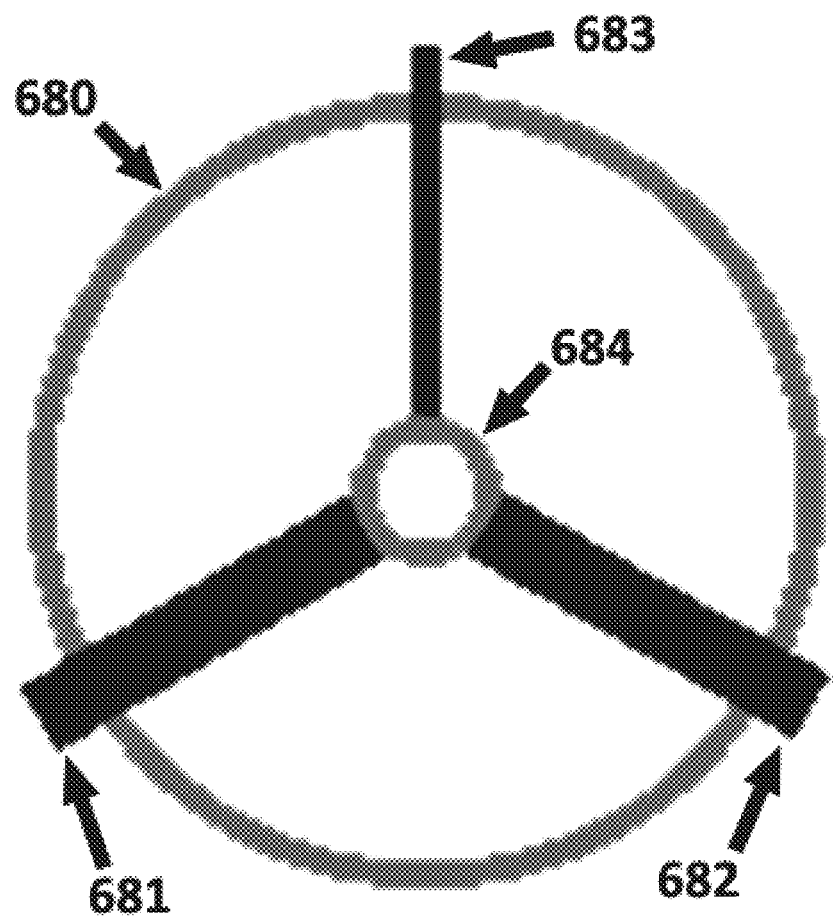
FIG. 34 is a top-down symbolic and/or schematic view of a wave energy converter prefabricated to include two connectors and intermediary cables of a relatively heavy gauge, and one connector and intermediary cable of a relatively light gauge.

FIG. 34 is a top-down symbolic and/or schematic view of an embodiment of the current disclosure. A wave energy converter 680 has been prefabricated so as to include three externally accessible electrical connectors 681-683, providing connection points and/or interfaces that can electrically connect and/or join one or more external electrical cables, and/or their respective plugs and/or connectors, to the converter's internal wiring and/or grid.

The internal wiring within wave energy converter 680 that is connected to, and/or that electrically connects, the converter's two externally accessible electrical connectors 681 and 682 are capable of transmitting relatively powerful electrical currents, voltages and/or signals. The internal wiring within wave energy converter 680 that is connected to, and/or that electrically connects, the converter's externally accessible electrical connector 683 is capable of transmitting only relatively small and/or weak electrical currents, voltages and/or signals, and not currents, voltages and/or signals as powerful as those that the wiring connecting connectors 681 and 682 can transmit.

All of the internal wiring connected to the converter's 680 externally accessible electrical connectors is electrically interconnected, and a current, voltage and/or signal present on any one of those electrical connectors will be transmitted to, and/or manifested at, each of the other electrical connectors.

A generator 684 within the wave energy converter 680 is electrically connected to the wiring that interconnects all three of the converter's externally accessible electrical connectors, and will be transmitted to each and every external electrical cable connected to any of those externally accessible electrical connectors.

Figure 35:
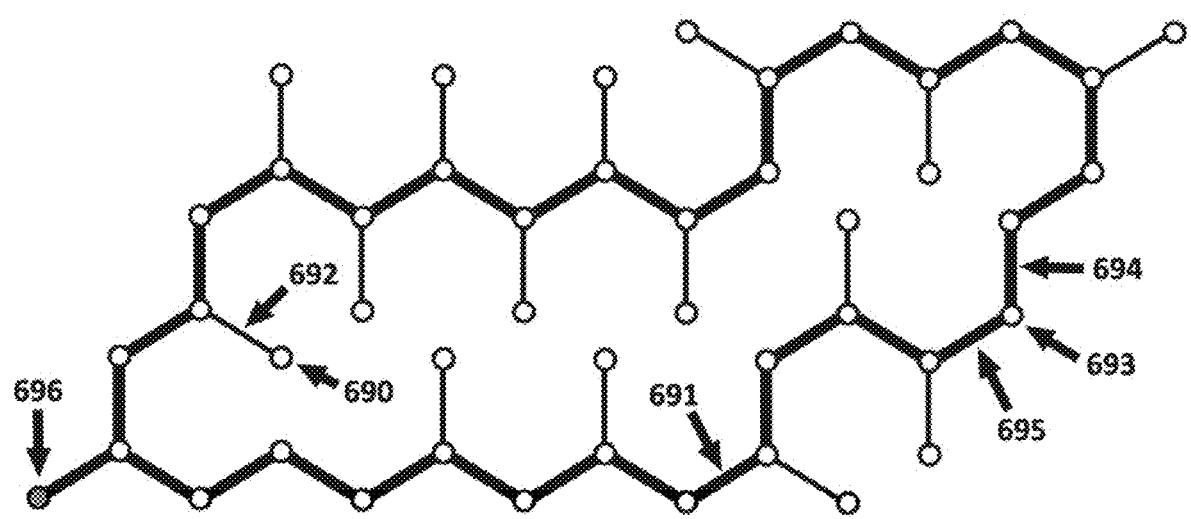
FIG. 35 is a top-down view of an elongate farm of floating devices interconnected with wave energy converters with the types and orientations of electrical connections illustrated in FIG. 34, and with corresponding interconnecting electrical cables of those differing gauges.

FIG. 35 is a top-down view of an embodiment of the current disclosure. An elongate farm of floating wave energy converters, e.g. 690, of the type, design, and/or characteristics of the converter illustrated in FIG. 34, are electrically interconnected with electrical cables, e.g. 691, so as to form an electrical grid within the farm, and positioned adjacent to an upper surface of the body of water on which the converters of the farm float.

This farm-level electrical grid contains, and/or is comprised of, electrical cables of at least two different gauges and/or electrical capacities. Some cables, e.g. 691, (represented by relatively heavy solid lines) are of relatively heavy gauge, and are therefore capable of transmitting relatively powerful currents, voltages and/or signals. Other cables, e.g. 692, (represented by relatively light solid lines) are of relatively light gauge, and are therefore capable of transmitting only relatively small and/or weak currents, voltages and/or signals.

The electrical cables of differing gauges are interconnected by means of their connections to the two different types and/or gauges of the externally accessible electrical connectors of correspondingly differing gauges on the constituent wave energy converters of the type illustrated in FIG. 34.

Note that through the combination of wave energy converters of a single type, design, and/or structure, with standardized, commoditized, and/or modular, electrical cables of just two difference gauges, the connectors of which are arranged in a standardized pattern, a relatively complicated and efficient farm electrical grid has been created and/or defined.

Through the combination of electrical cables of differing gauges, an electrical grid may be created that conserves the materials and/or resources of which the cables are made, as well as minimizing the time and cost of implementing such a grid. Relatively heavy-gauge electrical cables provide a "backbone" for the grid through which large amounts of current, voltage, and/or electrical power, may be transmitted. And, relatively light-gauge electrical cables provide electrical connections to individual converters, and/or to small subsets of converters, and electrically connect them to the grid without the waste of using relatively heavier cables to implement such connections that will not need the additional electrical bandwidth, and/or capacity, that the relatively heavier cables would provide.

Converter 693 is connected to two relatively heavy gauge electrical cables 694 and 695 through that portion of its internal wiring that connects the externally accessible electrical connectors 681 and 682 in FIG. 34.

Converter 690 is connected to only a single electrical cable 692 of relatively low capacity. This relatively low capacity electrical cable is connected to the converter's generator through that portion of the converter's internal wiring that connects the externally accessible electrical connector 693 in FIG. 34.

Note that the electrical grid of the farm illustrated in FIG. 35 contains a backbone 694, i.e. a path through the farm's electrical cables, and corresponding internal converter wiring, that is composed of relatively heavy gauge and/or high-capacity conductors, that is, at least in part, circular. Such a circular grid backbone, and/or internal electrical "loop," within the farm's electrical grid has the advantage that any single fault, failure, and/or break, along the grid will not disconnect any of the farm's converters from the grid, and all of the power generated by converters within the grid will still be transmitted to that buoy, point, and/or converter 696, within the grid at which it is merged, combined, processed, utilized, and/or transmitted to a subsea power cable.

Figure 36:
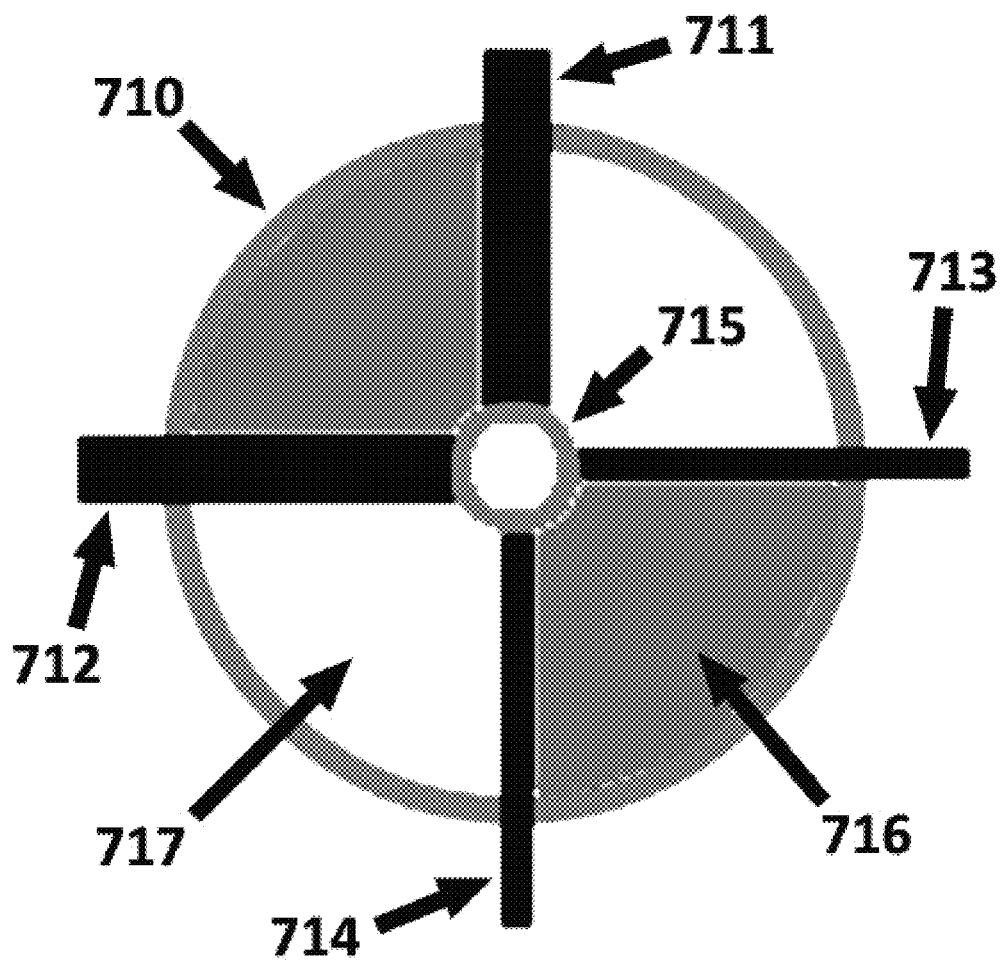
FIG. 36 is a top-down symbolic and/or schematic view of a wave energy converter prefabricated to include two connectors and intermediary cables each of two different gauges.

FIG. 36 is a top-down symbolic and/or schematic view of an embodiment of the current disclosure. A wave energy converter 710 has been prefabricated so as to include four externally accessible electrical connectors 711-714 providing connection points and/or interfaces that can electrically connect and/or join one or more external electrical cables, and/or their respective connectors, to the converter's internal wiring and/or grid.

The internal wiring within wave energy converter 710 that is connected to, and/or that electrically connects, the converter's two externally accessible electrical connectors 711 and 712 are capable of transmitting relatively powerful electrical currents, voltages and/or signals.

The internal wiring within wave energy converter 710 that is connected to, and/or that electrically connects, the converter's two externally accessible electrical connectors 713 and 714 are capable of transmitting only relatively weak electrical currents, voltages and/or signals, but not currents, voltages and/or signals as powerful as those that the wiring connecting connectors 711 and 712 can transmit.

All of the internal wiring connected to converter 710's externally accessible electrical connectors is electrically interconnected, and a current, voltage and/or signal present on any one of those electrical connectors will be transmitted to, and/or manifested at, each of the other electrical connectors.

A generator 715 within the wave energy converter 710 is electrically connected to the wiring that interconnects all four of the converter's externally accessible electrical connectors, and will be transmitted to each and every external electrical cable connected to any of those externally accessible electrical connectors.

The symbolic representation 710 of this wave energy converter includes quadrants distinguished by differential shading. Quadrant 716, and the diagonally opposite quadrant, are shaded darkly. The other two quadrants, e.g. 717, are unshaded. This is intended to make the orientation of these converter's more easily discernable within the sample farm embodiment illustrated in FIG. 37.

Figure 37:
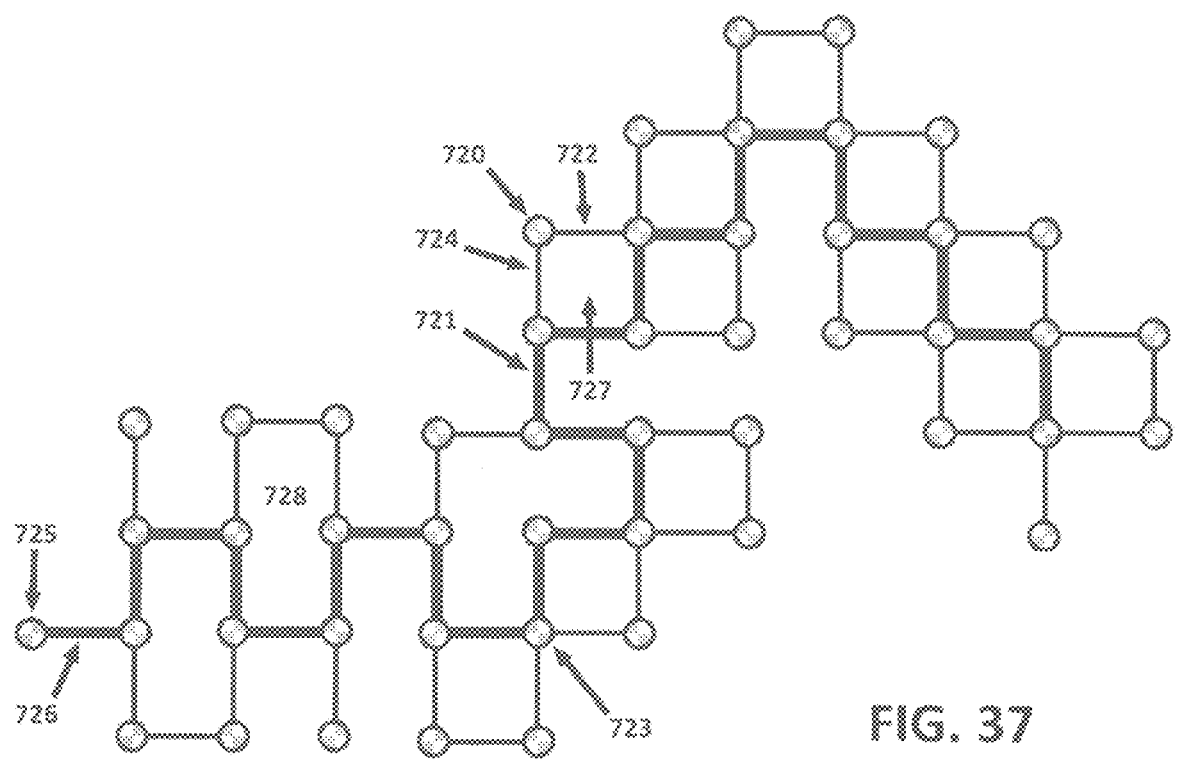
FIG. 37 is a top-down view of an elongate farm of floating devices interconnected with wave energy converters with the types and orientations of electrical connections illustrated in FIG. 36, and with corresponding interconnecting electrical cables of those differing gauges.

FIG. 37 is a top-down view of an embodiment of the current disclosure. A serpentine farm of floating wave energy converters, e.g. 720, of the type, design, and/or characteristics of the converter illustrated in FIG. 36, are electrically interconnected with electrical cables, e.g. 721 and 722, that are positioned adjacent to an upper surface of the body of water on which the converters float so as to form a surface electrical grid within the farm.

This farm-level electrical grid contains, and/or is comprised of, electrical cables of at least two different gauges and/or electrical capacities. Some cables, e.g. 721, (represented by relatively heavy solid lines) are of relatively heavy gauge, and are therefore capable of transmitting relatively powerful currents, voltages and/or signals. Other cables, e.g. 722, (represented by relatively light solid lines) are of relatively light gauge, and are therefore capable of transmitting only relatively small and/or weak currents, voltages and/or signals.

The electrical cables of differing gauges are interconnected by means of their connections to the two different types and/or gauges of the externally accessible electrical connectors of correspondingly differing gauges on the constituent wave energy converters of the type illustrated in FIG. 36.

Note that through the combination of wave energy converters of a single type, design, and/or structure, with standardized, commoditized, and/or modular, electrical cables of just two difference gauges, the connectors of which are arranged in a standardized pattern, a relatively complicated and efficient farm electrical grid has been created and/or defined.

Through the combination of electrical cables of differing gauges, an electrical grid may be created that conserves the materials and/or resources of which the cables are made, as well as minimizing the time and cost of implementing such a grid. Relatively heavy-gauge electrical cables provide a "backbone" for the grid through which large amounts of current, voltage, and/or electrical power, may be transmitted. And, relatively light-gauge electrical cables provide electrical connections to individual converters, and/or to small subsets of converters, and electrically connect them to the grid without the waste of using relatively heavier cables to implement such connections that will not need the additional electrical bandwidth, and/or capacity, that the relatively heavier cables would provide.

Converter 723 is connected to two relatively heavy gauge electrical cables and to two relatively light gauge electrical cables. Each cable is connected to one of the four externally accessible electrical connectors on, and/or in, the converter 723. And, moreover, each cable is connected to one of the converter's four externally accessible electrical connectors, for which the converter's internal wiring connected to that connector matches the gauge and/or electrical capacity of the cable.

Converter 720 is connected to two electrical cables 724 and 722 which are of relatively low capacity. These relatively low capacity electrical cables are connected to the converter's generator through that portion of the converter's internal wiring that connects the externally accessible electrical connectors 711 and 714 in FIG. 36.

Converter 725 is connected to only a single electrical cable 726 of relatively high capacity. This relatively heavy gauge electrical cable is connected to the converter's generator through that portion of the converter's internal wiring that connects the externally accessible electrical connectors 711 and 712 in FIG. 36.

Note that the electrical grid of the farm illustrated in FIG. 37 contains a backbone 721, i.e. a path through the farm's electrical cables, and corresponding internal converter wiring, that is composed of relatively heavy gauge and/or high-capacity conductors, and extends from one end of the serpentine farm to the other. However, there are no loops and/or circular connections within the farm's backbone. Because of this, a break, fault, and/or other failure, in one of the heavy gauge electrical cables of the backbone, and/or within the heavy-gauge portion of the internal wiring one of the converters within the backbone, could potentially electrically isolate one end of the farm from the other, potentially preventing the transmission of electrical power generated by the converters on one end of the farm to a centralized connection to a subsea power cable.

Contrary to the lack of loops in the heavy-gauge portions of the illustrated farm (i.e., loops comprised solely of heavy-gauge connectors), the farm does contain many loops, e.g., 727 and 728, and/or circular circuits within those portions of the grid composed and/or comprised of both relatively light-gauge and relatively heavy-gauge electrical cables. This can provide at least some redundancy in the pathways through the electrical grid that may allow some fault-tolerance with respect to breaks, and/or failures, in some of those light-gauge electrical cables, and/or the converters thereby linked to the grid.

Figure 38:
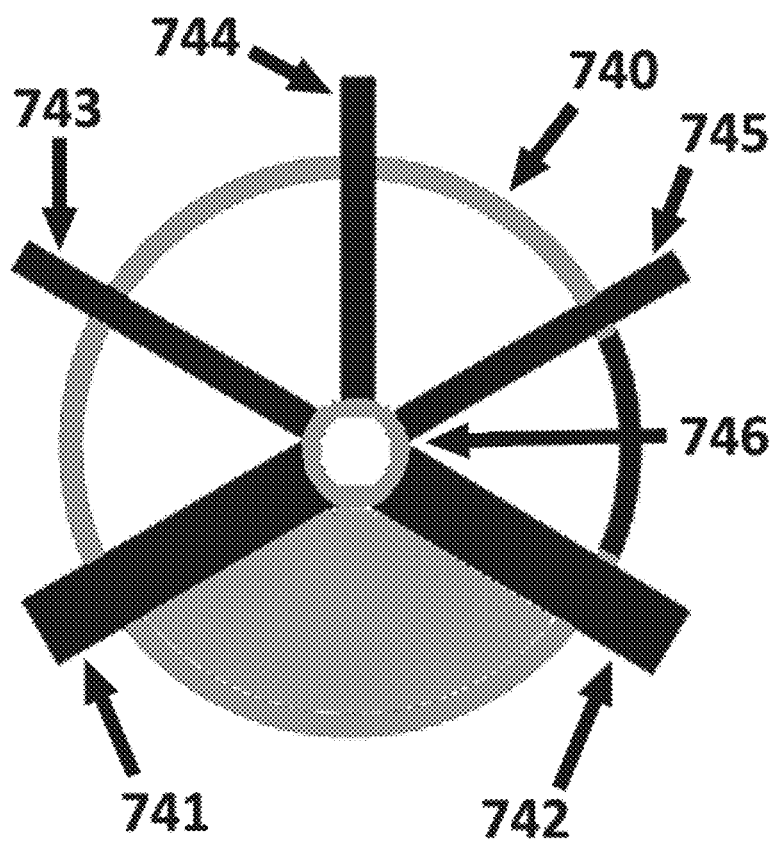
FIG. 38 is a top-down symbolic and/or schematic view of a wave energy converter prefabricated to include two connectors and intermediary cables of a relatively heavy gauge, and three connectors and intermediary cables of a relatively light gauge.

FIG. 38 is a top-down symbolic and/or schematic view of an embodiment of the current disclosure. A wave energy converter 740 has been prefabricated so as to include five externally accessible electrical connectors 741-745 providing connection points and/or interfaces that can electrically connect and/or join one or more external electrical cables, and/or their respective connectors, to the converter's internal wiring and/or grid.

The internal wiring within wave energy converter 740 that is connected to, and/or that electrically connects, the converter's two externally accessible electrical connectors 741 and 742 are capable of transmitting relatively powerful electrical currents, voltages and/or signals.

The internal wiring within wave energy converter 740 that is connected to, and/or that electrically connects, the converter's three externally accessible electrical connectors 743-745 are capable of transmitting only relatively weak electrical currents, voltages and/or signals, but not currents, voltages and/or signals as powerful as those that the wiring connecting connectors 741 and 742 can transmit.

All of the internal wiring connected to converter 740's externally accessible electrical connectors is electrically interconnected, and a current, voltage and/or signal present on any one of those electrical connectors will be transmitted to, and/or manifested at, each of the other electrical connectors.

A generator 746 within the wave energy converter 740 is electrically connected to the wiring that interconnects all five of the converter's externally accessible electrical connectors, and will be transmitted to each and every external electrical cable connected to any of those externally accessible electrical connectors.

The symbolic representation 740 of this wave energy converter includes a pie-shaped portion distinguished by relatively dark shading. The other portions of the converter's symbolic representation is unshaded. This is intended to make the orientation of these converter's more easily discernable within the sample farm embodiment illustrated in FIG. 39.

Figure 39:
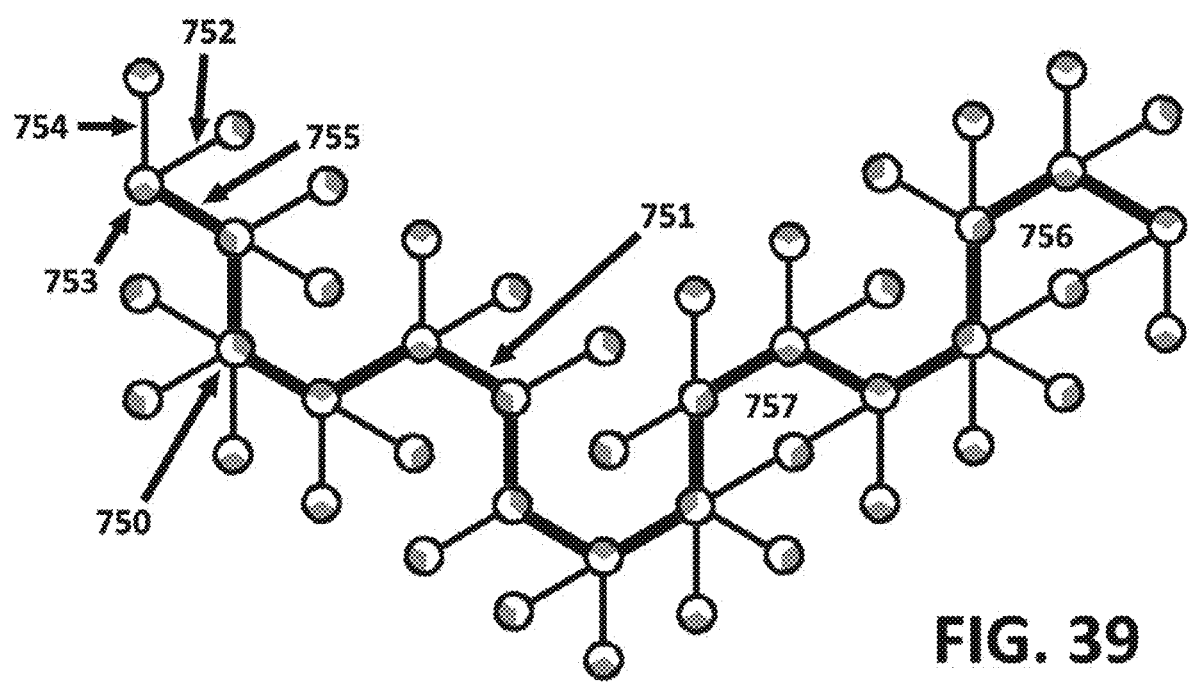
FIG. 39 is a top-down view of an elongate farm of floating devices interconnected with wave energy converters with the types and orientations of electrical connections illustrated in FIG. 38, and with corresponding interconnecting electrical cables of those differing gauges.

FIG. 39 is a top-down view of an embodiment of the current disclosure. An elongate farm of floating wave energy converters, e.g. 750, of the type, design, and/or characteristics of the converter illustrated in FIG. 38, are electrically interconnected with electrical cables, e.g. 751 and 752, so as to form an electrical grid within the farm.

This farm-level electrical grid contains, and/or is comprised of, electrical cables of at least two different gauges and/or electrical capacities. Some cables, e.g. 751, (represented by relatively heavy solid lines) are of relatively heavy gauge, and are therefore capable of transmitting relatively powerful currents, voltages and/or signals. Other cables, e.g. 752, (represented by relatively light solid lines) are of relatively light gauge, and are therefore capable of transmitting only relatively small and/or weak currents, voltages and/or signals.

The electrical cables of differing gauges are interconnected by means of their connections to the two different types and/or gauges of the externally accessible electrical connectors of correspondingly differing gauges on the constituent wave energy converters of the type illustrated in FIG. 38.

Note that through the combination of wave energy converters of a single type, design, and/or structure, with standardized, commoditized, and/or modular, electrical cables of just two difference gauges, the connectors of which are arranged in a standardized pattern, a relatively complicated and efficient farm electrical grid has been created and/or defined.

Through the combination of electrical cables of differing gauges, an electrical grid may be created that conserves the materials and/or resources of which the cables are made, as well as minimizing the time and cost of implementing such a grid. Relatively heavy-gauge electrical cables provide a "backbone" for the grid through which large amounts of current, voltage, and/or electrical power, may be transmitted. And, relatively light-gauge electrical cables provide electrical connections to individual converters, and/or to small subsets of converters, and electrically connect them to the grid without the waste of using relatively heavier cables to implement such connections that will not need the additional electrical bandwidth, and/or capacity, that the relatively heavier cables would provide.

Converter 750 is connected to two relatively heavy gauge electrical cables and to three relatively light gauge electrical cables. Each cable is connected to one of the five externally accessible electrical connectors on, and/or in, the converter 750. And, moreover, each cable is connected to one of the converter's five externally accessible electrical connectors, for which the converter's internal wiring connected to that connector matches the gauge and/or electrical capacity of the cable.

Converter 753 is connected to two electrical cables 754 and 752 which are of relatively low capacity. These relatively low capacity electrical cables are connected to the converter's generator through that portion of the converter's internal wiring that connects the externally accessible electrical connectors 743-745 in FIG. 38.

Converter 753 is connected to one electrical cable 755 of relatively high capacity. This relatively heavy gauge electrical cable is connected to the converter's generator through that portion of the converter's internal wiring that connects the externally accessible electrical connectors 741-742 in FIG. 38.

Note that the electrical grid of the farm illustrated in FIG. 39 contains a backbone 751, i.e. a path through the farm's electrical cables, and corresponding internal converter wiring, that is composed of relatively heavy gauge and/or high-capacity conductors, and extends from one end of the elongate farm to the other. However, there are no loops and/or circular connections within the farm's backbone. Because of this, a break, fault, and/or other failure, in one of the heavy gauge electrical cables of the backbone, and/or within the heavy-gauge portion of the internal wiring one of the converters within the backbone, could potentially electrically isolate one end of the farm from the other, potentially preventing the transmission of electrical power generated by the converters on one end of the farm to a centralized connection to a subsea power cable.

Contrary to the lack of loops in the heavy-gauge portions of the illustrated farm, the farm does contain two loops 756 and 757 and/or circular circuits within those portions of the grid composed and/or comprised of both relatively heavy-gauge and relatively light-gauge electrical cables. This provides at least some redundancy in the pathways through the electrical grid that may allow some fault-tolerance with respect to breaks, and/or failures, in some of those light-gauge electrical cables, and/or the converters thereby linked to the grid.

A break and/or fault in a portion of the backbone within loop 757 would send the current, voltage, and/or electrical signals, from at least fourteen converters through the portion of the loop composed and/or comprised of relatively light-gauge electrical cables. Potentially exceeding their capacities and precipitating their failure as well.

Figure 40:
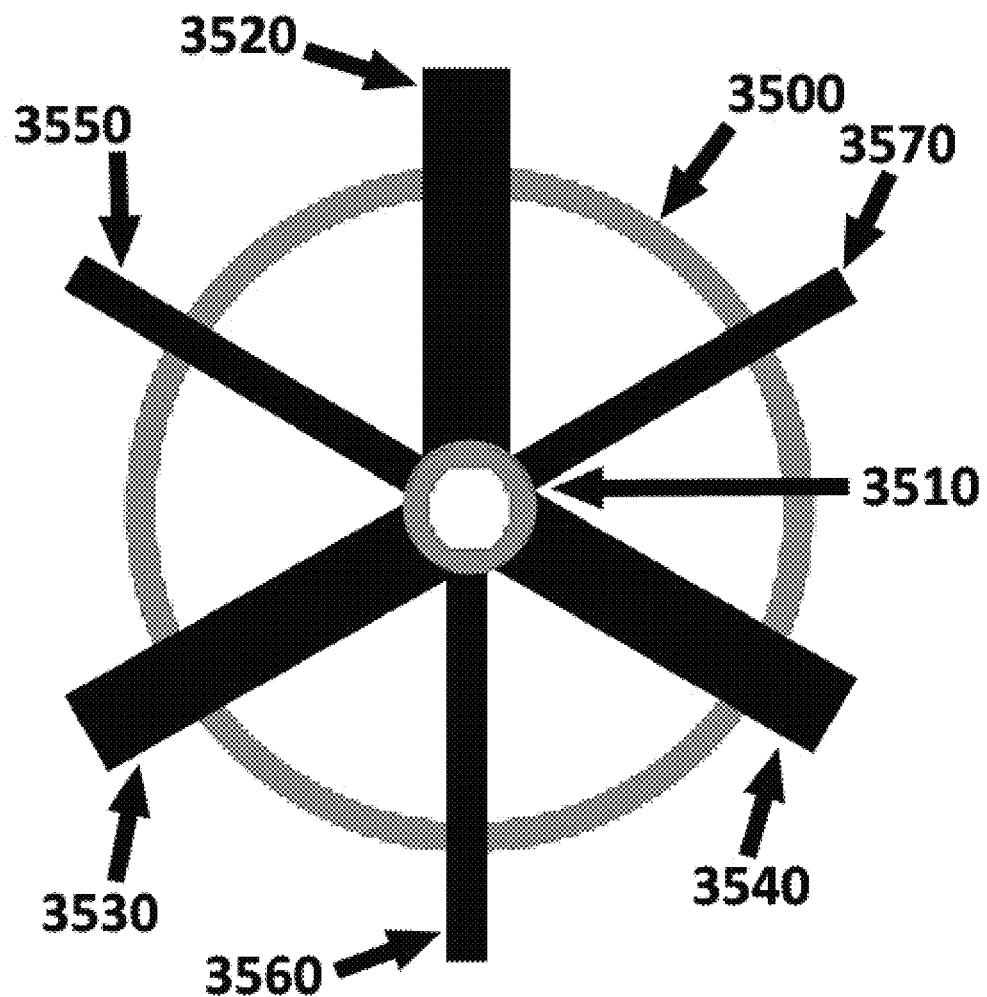
FIG. 40 is a top-down symbolic and/or schematic view of a wave energy converter prefabricated to include three connectors and intermediary cables of a relatively heavy gauge, and three connectors and intermediary cables of a relatively light gauge.

FIG. 40 is a top-down symbolic and/or schematic view of an embodiment of the current disclosure. A wave energy converter 3500 has been prefabricated so as to include six externally accessible electrical connectors 3520, 3530, 3540, 3550, 3560, 3570 providing connection points and/or interfaces that can electrically connect and/or join one or more external electrical cables, and/or their respective connectors, to the converter's internal wiring and/or grid.

The internal wiring within wave energy converter 3500 that is connected to, and/or that electrically connects, the converter's three externally accessible electrical connectors 3520, 3530, 3540 are capable of transmitting relatively powerful electrical currents, voltages and/or signals.

The internal wiring within wave energy converter 3500 that is connected to, and/or that electrically connects, the converter's three externally accessible electrical connectors 3550, 3560, 3570 are capable of transmitting only relatively weak electrical currents, voltages and/or signals, but not currents, voltages and/or signals as powerful as those that the wiring connecting connectors 3520, 3530, 3540 can transmit.

All of the internal wiring connected to converter 3500's externally accessible electrical connectors is electrically interconnected, and a current, voltage and/or signal present on any one of those electrical connectors will be transmitted to, and/or manifested at, each of the other electrical connectors.

A generator 3510 within the wave energy converter 3500 is electrically connected to the wiring that interconnects all six of the converter's externally accessible electrical connectors, and will be transmitted to each and every external electrical cable connected to any of those externally accessible electrical connectors.

Figure 41:
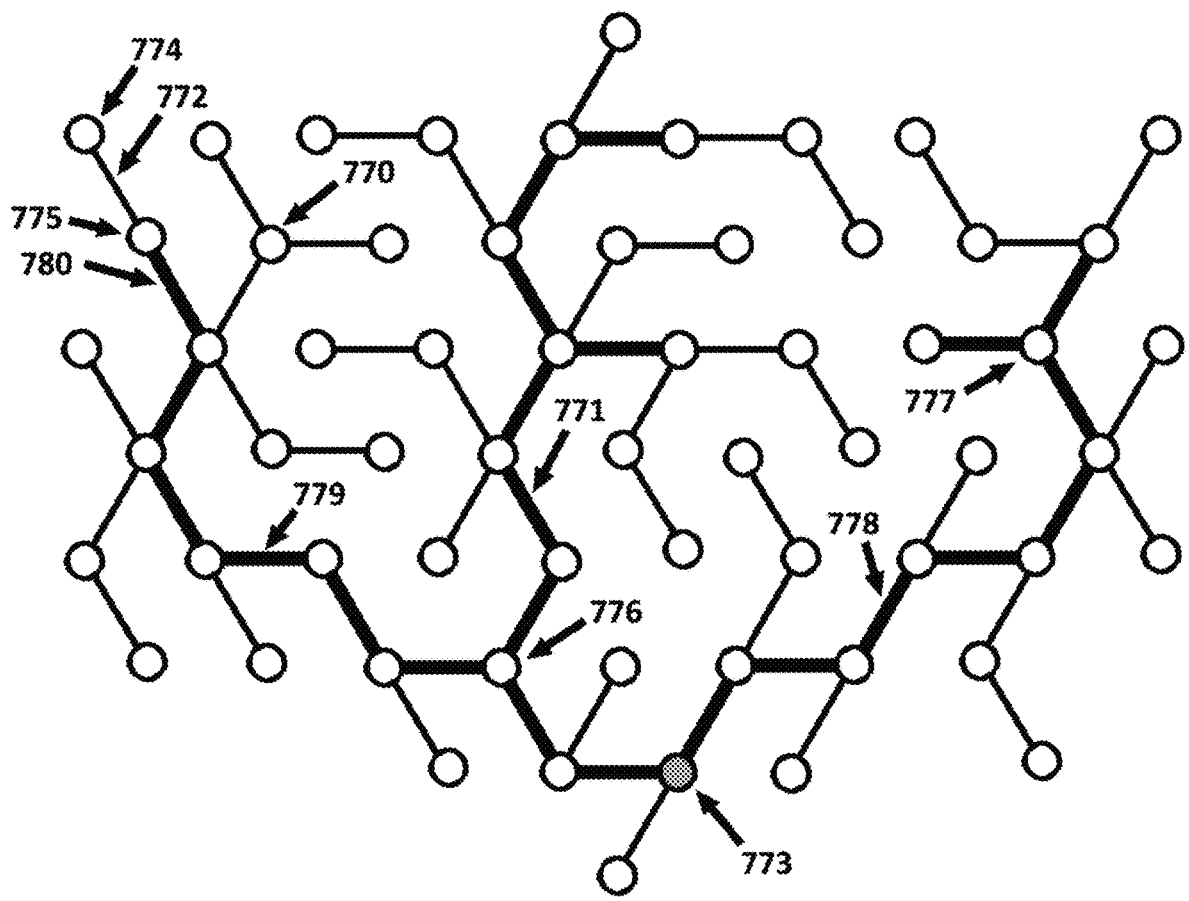
FIG. 41 is a top-down view of an elongate farm of floating devices interconnected with wave energy converters with the types and orientations of electrical connections illustrated in FIG. 40, and with corresponding interconnecting electrical cables of those differing gauges.

FIG. 41 is a top-down view of an embodiment of the current disclosure. A farm of floating wave energy converters, e.g. 770, of the type, design, and/or characteristics of the converter illustrated in FIG. 40, are electrically interconnected with electrical cables, e.g. 771 and 772, so as to form an electrical grid within the farm. The electrical grid is positioned adjacent to an upper surface of the body of water on which the farm's converters float.

This farm-level electrical grid contains, and/or is comprised of, electrical cables of at least two different gauges and/or electrical capacities. Some cables, e.g. 771, (represented by relatively heavy solid lines) are of relatively heavy gauge, and are therefore capable of transmitting relatively powerful currents, voltages and/or signals. Other cables, e.g. 772, (represented by relatively light solid lines) are of relatively light gauge, and are therefore capable of transmitting only relatively small and/or weak currents, voltages and/or signals.

The electrical cables of differing gauges are interconnected by means of their connections to the two different types and/or gauges of the externally accessible electrical connectors of correspondingly differing gauges on the constituent wave energy converters of the type illustrated in FIG. 40.

Note that through the combination of wave energy converters of a single type, design, and/or structure, with standardized, commoditized, and/or modular, electrical cables of just two difference gauges, the connectors of which are arranged in a standardized pattern, a relatively complicated and efficient farm electrical grid has been created and/or defined.

Through the combination of electrical cables of differing gauges, an electrical grid may be created that conserves the materials and/or resources of which the cables are made, as well as minimizing the time and cost of implementing such a grid. Relatively heavy-gauge electrical cables provide a "backbone" for the grid through which large amounts of current, voltage, and/or electrical power, may be transmitted. And, relatively light-gauge electrical cables provide electrical connections to individual converters, and/or to small subsets of converters, and electrically connect them to the grid without the waste of using relatively heavier cables to implement such connections that will not need the additional electrical bandwidth, and/or capacity, that the relatively heavier cables would provide.

Note that the electrical grid of the farm illustrated in FIG. 41 contains a backbone, i.e. a path through the farm's electrical cables, and corresponding internal converter wiring, that is composed of relatively heavy gauge and/or high-capacity conductors, and extends from one end of the elongate farm to the other, and contains three branches. However, there are no loops and/or circular connections within the farm's backbone. Because of this, a break, fault, and/or other failure, in one of the heavy gauge electrical cables of the backbone, and/or within the heavy-gauge portion of the internal wiring one of the converters within the backbone, could potentially electrically isolate one end of the farm from the other, potentially preventing the transmission of electrical power generated by the converters on one end of the farm to a centralized connection, e.g. at converter 773, to a subsea power cable.

Converter 774 is electrically connected to converter 775 by means of a relatively light-gauge cable 772 and nominally only transmits energy generated by converter 774.

Converters 776 and 777 each transmit their power into the grid through relatively heavy-gauge electrical cables, e.g., of the kind at 771, 778, 779, and 780.

Each of the foregoing described and depicted embodiments are intended to be illustrative of the present invention without being limited. Except where expressly stated, the invention can incorporate elements of the various described embodiments into a new combination without departing from the scope and spirit of the invention.

We claim:

1. A floating network of motion-to-electrical energy converters, comprising:
   a plurality of buoyant wave-to-energy converters attached together by flexible mooring cables;
   a network of electrical cables connecting the plurality of buoyant wave-to-energy converters, said network of electrical cables comprising first gauge electrical cables, second gauge electrical cables, and third gauge electrical cables, said first gauge electrical cables having a larger electrical capacity than said second gauge electrical cables, and said second gauge electrical cables having a larger electrical capacity than said third gauge electrical cables;
   wherein each buoyant wave-to-energy converter is connected to a first adjacent buoyant wave-to-energy converter by at least one cable selected from said first gauge electrical cables, second gauge electrical cables, and third gauge electrical cables; and
   wherein a first subset of the buoyant wave-to-energy converters are connected to the first adjacent buoyant wave-to-energy converter by a cable that is a first gauge electrical cable;
   wherein a second subset of the buoyant wave-to-energy converters are connected to the first adjacent buoyant wave-to-energy converter by a cable that is a second gauge electrical cable; and
   wherein a distance between two adjacent buoyant wave-to-energy converters varies, influenced by a tension on a connected flexible mooring cable.

2. The floating network of motion-to-energy converters of claim 1, further comprising a plurality of floats, each float attached to a cable connecting adjacent buoyant wave-to-energy converters.

3. The floating network of motion-to-energy converters of claim 1, wherein one of the buoyant wave-to-energy converter converters includes an electrical socket through which the wave-to-energy converter is electrically connected to a complementary electrical plug of an adjacent buoyant wave-to-energy converter via an electrical cable.

4. The floating network of motion-to-energy converters of claim 1, wherein a third subset of buoyant wave-to-energy converters are electrically coupled directly to first, second, and third adjacent buoyant wave-to-energy converters.

5. The floating network of motion-to-energy converters of claim 1, wherein a fourth subset of the buoyant wave-to-energy converters, which are not members of the first subset, the second subset, or the third subset, are connected to the first adjacent buoyant wave-to-energy converter by a cable that is a third gauge electrical cable.

6. The floating network of motion-to-energy converters of claim 1, wherein the flexible mooring cables are the electrical cables.

* * * * *